United States Patent
Sugano et al.

(10) Patent No.: US 7,276,463 B2
(45) Date of Patent: Oct. 2, 2007

(54) POLYMERIZATION CATALYST FOR α-OLEFINS AND PROCESS FOR PRODUCTION OF α-OLEFIN POLYMERS THEREWITH

(75) Inventors: Toshihiko Sugano, Mie (JP); Kouji Nakayama, Mie (JP); Shigeyuki Matsunami, Kanagawa (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 10/527,070

(22) PCT Filed: Sep. 9, 2003

(86) PCT No.: PCT/JP03/11498

§ 371 (c)(1),
(2), (4) Date: Mar. 9, 2005

(87) PCT Pub. No.: WO2004/024783

PCT Pub. Date: Mar. 25, 2004

(65) Prior Publication Data

US 2006/0068984 A1   Mar. 30, 2006

(30) Foreign Application Priority Data

Sep. 11, 2002 (JP) .............................. 2002-264955

(51) Int. Cl.
*B01J 31/00* (2006.01)
*C08F 4/44* (2006.01)

(52) U.S. Cl. ............... 502/103; 502/150; 502/152; 502/156; 502/167; 502/171; 526/125.3

(58) Field of Classification Search ........... 502/150, 502/152, 158, 167, 171, 103
See application file for complete search history.

(56) References Cited

U.S. PATENT DOCUMENTS

| | | | |
|---|---|---|---|
| 3,140,277 A | 7/1964 | Coover, Jr. et al. | |
| 3,287,340 A | 11/1966 | Coover, Jr. et al. | |
| 4,226,963 A | 10/1980 | Giannini et al. | |
| 4,336,360 A | 6/1982 | Giannini et al. | |
| 5,015,612 A * | 5/1991 | Kioka et al. | 502/133 |
| 5,153,158 A * | 10/1992 | Kioka et al. | 502/126 |
| 5,247,031 A * | 9/1993 | Kioka et al. | 526/124.8 |

(Continued)

FOREIGN PATENT DOCUMENTS

EP   0 045 975   2/1982

(Continued)

*Primary Examiner*—J. A. Lorengo
*Assistant Examiner*—Patricia L. Hailey
(74) *Attorney, Agent, or Firm*—Oblon, Spivak, McClelland, Maier & Neustadt, P.C.

(57) ABSTRACT

A catalyst having a high catalyst activity, which enables the production of an α-olefin polymer improved in stereoregularity by decreasing an amorphous component, and a production method for the α-olefin polymer, are developed. Described are a catalyst for polymerizing α-olefin comprising a combination of (A) a solid catalyst component containing magnesium, titanium and a halogen as an essential component, which may contain if necessary, a silicon compound, an organoaluminum compound, and an electron donor; (B) an organoaluminum compound; and (C) a compound containing a C(=O)N bond such as an amide or an urea; which may further contain if necessary, (D) a silicon compound or a diether compound; and a production method for an α-olefin polymer using the same.

6 Claims, 1 Drawing Sheet

U.S. PATENT DOCUMENTS

| | | | | |
|---|---|---|---|---|
| 5,247,032 A | * | 9/1993 | Kioka et al. | 526/128 |
| 5,324,805 A | * | 6/1994 | Kioka et al. | 526/348.6 |
| 5,412,020 A | * | 5/1995 | Yamamoto et al. | 524/505 |
| 5,451,642 A | * | 9/1995 | Abe et al. | 525/179 |
| 5,552,359 A | | 9/1996 | Morini et al. | |
| 5,583,188 A | | 12/1996 | Kashiwa et al. | |
| 5,837,791 A | * | 11/1998 | Sagane et al. | 526/336 |
| 6,040,407 A | * | 3/2000 | Ishida et al. | 526/281 |
| 6,287,705 B1 | * | 9/2001 | Seta et al. | 428/500 |
| 6,753,378 B2 | * | 6/2004 | Kojoh et al. | 525/7.4 |

FOREIGN PATENT DOCUMENTS

| | | |
|---|---|---|
| EP | 0 045 976 | 2/1982 |
| JP | 57-63310 | 4/1982 |
| JP | 57-63311 | 4/1982 |
| JP | 58-118804 | 7/1983 |
| JP | 58-138706 | 8/1983 |
| JP | 6-263816 | 9/1994 |
| JP | 7-145204 | 6/1995 |
| JP | 9-241318 | 9/1997 |
| JP | 10-212314 | 8/1998 |
| JP | 2001-106717 | 4/2001 |
| JP | 2002-265517 | 9/2002 |
| JP | 2002-265518 | 9/2002 |

* cited by examiner

Fig. 1

POLYMERIZATION CATALYST FOR α-OLEFINS AND PROCESS FOR PRODUCTION OF α-OLEFIN POLYMERS THEREWITH

CROSS REFERENCES TO RELATED APPLICATIONS

This application is a national stage application of International Patent Application No. PCT/JP03/11498, filed on Sep. 9, 2003, and claims priority to Japanese Patent Application No. 2002-264955, filed on Sep. 11, 2002, both of which are incorporated herein by reference in their entireties.

1. Technical Field

The present invention relates to a catalyst for polymerizing α-olefin and to a production method for α-olefin polymer using the same. In further detail, the present invention relates to a catalyst for polymerizing α-olefin, comprising a combination of a solid catalyst component, an organoaluminum compound, and a specific organic compound containing oxygen atom and nitrogen atom; and to a production method of α-olefin polymer using the same, thereby enabling the high yield production of a highly crystalline α-olefin polymer containing extremely low amount of amorphous component.

2. Background Art

Polyolefin, which is represented by polyethylene, polypropylene, and the like, is one of the most important plastics of high practical use; at present, it is generally used in automobile parts, home electric appliances, and the like.

Concerning the production of polyolefin by polymerization, common olefins are extremely low in polymerization activity; however, the polymerization activity of olefin had been increased by using a Ziegler type catalyst containing a transition metal compound and an organoaluminum compound to realize industrial production of polyolefin. Furthermore, the continuous development and improvements in catalyst technology have realized the control of molecular weight distribution for better physical properties of the polymer, the improvement of stereoregularity of α-olefin, and the like.

More specifically, for example, a large number of techniques have been disclosed for producing α-olefin polymers at high yield as polymers having high stereoregularity by using a solid catalyst component containing titanium, magnesium, and a halogen as essentials (see, for example, patent references 1 to 3). Among them, as seen in Patent reference 3, the polymerization catalyst using the solid catalyst component above in combination with an organoaluminum compound and an electron donor is highly practical because it exhibits favorable catalyst activity and stereoregularity. Recently, proposals have been made to newly add an organosilicon compound to the catalyst component to further improve the polymerization activity and the stereoregularity, or to widen the molecular weight distribution (for instance, see patent references 4 and 5), and considerable number of other improvement proposals is being made.

However, so long as the present inventors are concerned, the stereoregularity of the α-olefin polymers is still insufficient even with the catalyst systems above, and particularly in the recent field where highly crystalline α-olefin polymers are required, further improvement for reducing the amorphous component is demanded.

[Patent reference 1] Japanese Patent Laid-Open No. 63310/1983 (Scope of claims, page 3, upper right column)

[Patent reference 2] Japanese Patent Laid-Open No. 63311/1983 (Scope of claims, page 3, upper left column)

[Patent reference 3] Japanese Patent Laid-Open No. 138706/1983 (Scope of claims, page 1, upper left column)

[Patent reference 4] Japanese Patent Laid-Open No. 145204/1995 (Abstract)

[Patent reference 5] Japanese Patent Laid-Open No. 241318/1997 (Abstract)

In the light of the aforementioned circumstances, the problems to be solved by the present invention are to realize a catalyst capable of producing an α-olefin polymer improved in stereoregularity by decreasing the amorphous components and to implement a production method for such α-olefin polymers.

DISCLOSURE OF THE INVENTION

In order to solve the aforementioned problems, the present inventors extensively studied each of the various catalyst components; as a result, they have found that a highly crystalline α-olefin polymer extremely low in amorphous components can be obtained at high yield by newly using an organic compound containing an oxygen atom in combination, and have improved stereoregularity by decreasing the amorphous components, and have applied for patents (Japanese Patent Application No. 2001-68169; Japanese Patent Laid-Open No. 2002-265517, Japanese Patent Application No. 2001-68093; Japanese Patent Laid-Open No. 2002-265518). Furthermore, in relation with the solution for the aforementioned problems, in order to realize high yield production of a highly crystalline α-olefin polymer extremely low in amorphous components, the inventors made total consideration and searched for a novel catalyst component from the view points of coordination at the catalyst active sites and selective poisoning. As a result of repeated experimental studies, they have found that a highly crystalline α-olefin polymer extremely low in amorphous components can be obtained at high yield by combining an organoaluminum compound and a compound having a specific C(=O)N bond with the solid catalyst component, and accomplished the present invention.

The newly created present invention, which is characterized in that a novel specific compound is employed for the catalyst component of the Ziegler type catalyst, is basically constituted by invention units (1) to (11) given below.

(1) A catalyst for polymerizing α-olefin, comprising a combination of: a component (A) which is a solid catalyst component containing magnesium, titanium, and a halogen as an essential component; a component (B) which is an organoaluminum compound; and a component (C) which is a compound containing a C(=O)N bond.

(2) The catalyst for polymerizing α-olefin described in the (1) above, wherein the compound containing a C(=O)N bond of the component (C) is selected from compounds represented by the following general formula [1] or [2]:

[1]

-continued

[2]

wherein $R^1$ to $R^7$ each represents an aliphatic hydrocarbon group, an alicyclic hydrocarbon group, an aromatic hydrocarbon group, or a hetero atom-containing hydrocarbon group, which have one or more carbon atoms, and the arbitrary groups of $R^1$ to $R^3$ and the arbitrary groups of $R^4$ to $R^7$ may be combined to form a ring structure.

(3) The catalyst for polymerizing α-olefin described in the (1) or (2) above, which further comprises in combination a component (D) which is a silicon compound, or a compound having at least two ether bonds.

(4) The catalyst for polymerizing α-olefin described in any one of the (1) to (3) above, wherein the component (A) is obtained by bringing the following component (A1) and component (A2) in contact with each other:
Component (A1): a solid component containing titanium, magnesium, and a halogen as an essential component; and
Component (A2): a silicon compound represented by the following formula:

wherein $R^8$ represents an aliphatic hydrocarbon group, an alicyclic hydrocarbon group, or a hetero atom-containing hydrocarbon group; $R^9$ represents an aliphatic hydrocarbon group, an alicyclic hydrocarbon group, a hetero atom-containing hydrocarbon group, a halogen, or hydrogen; $R^{10}$ represents a hydrocarbon group; and m is $1 \leq m \leq 3$.

(5) The catalyst for polymerizing α-olefin described in the (4), wherein the component (A) is obtained by further bringing the following component (A3) in contact: Component (A3): an organoaluminum compound.

(6) The catalyst for polymerizing α-olefin described in any one of the above (1) to (3), wherein the component (A) further comprises a component (E) which is an electron donor.

(7) The catalyst for polymerizing α-olefin described in the (4) or (5), wherein the component (A1) further comprises a component (E) which is an electron donor.

(8) The catalyst for polymerizing α-olefin described in any one of the (3) to (7), wherein the silicon compound of the component (D) is a silicon compound represented by the following formula:

wherein $R^8$ represents an aliphatic hydrocarbon group, an alicyclic hydrocarbon group, or a hetero atom-containing hydrocarbon group; $R^9$ represents an aliphatic hydrocarbon group, an alicyclic hydrocarbon group, a hetero atom-containing hydrocarbon group, a halogen, or hydrogen; $R^{10}$ represents a hydrocarbon group; and m is $1 \leq m \leq 3$.

(9) The catalyst for polymerizing α-olefin described in any one of the (3) to (7), wherein the compound having at least two ether bonds of the component (D) is an aliphatic diether or an aromatic diether.

(10) The catalyst for polymerizing α-olefin described in one of the (6) to (9), wherein the electron donor of the component (E) is a phthalic acid diester compound, a cellosolve acetate ester compound, a phthalic acid dihalide compound, a succinic acid diester compound, or an aliphatic or an aromatic diether compound.

(11) A production method for an α-olefin polymer, which comprises homopolymerizing or copolymerizing α-olefin using a catalyst for polymerizing α-olefin described in any one of the (1) to (10).

BEST MODE FOR CARRYING OUT THE INVENTION

Figure 1:
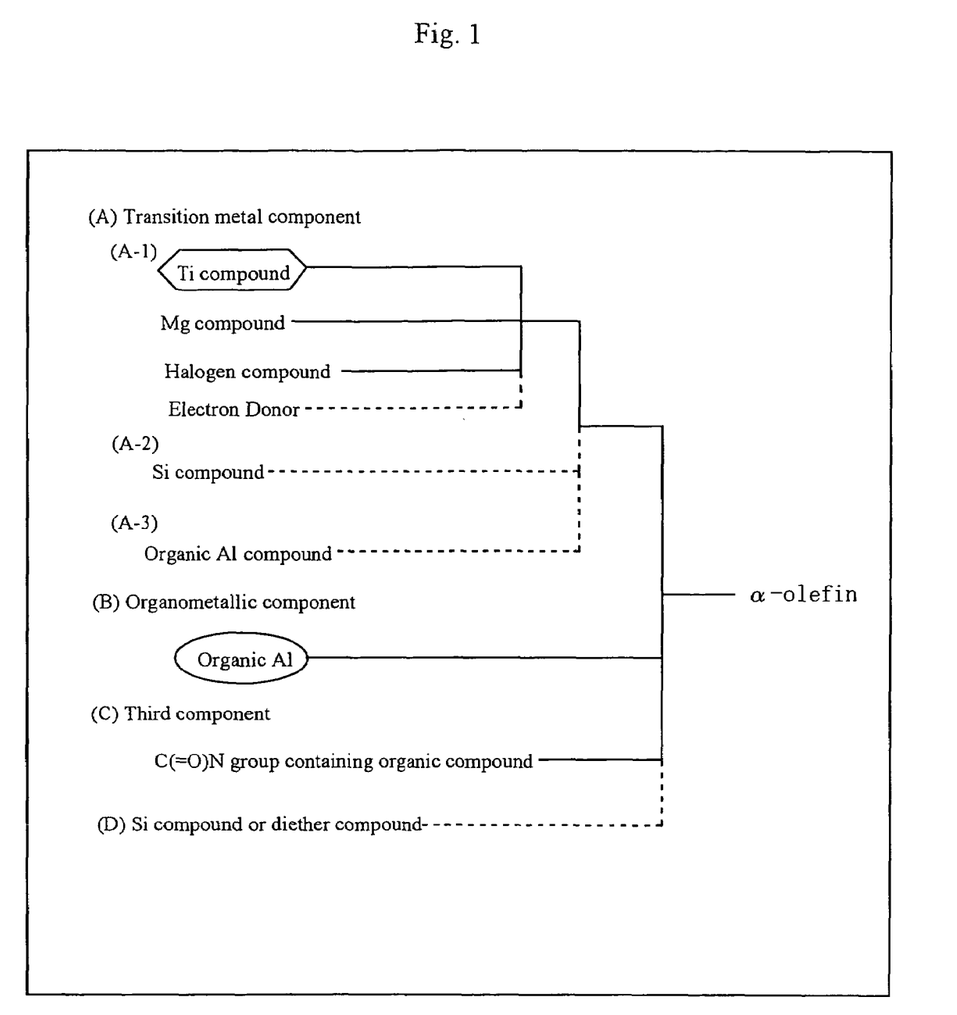
FIG. 1 is a flowchart to make the catalyst of the present invention more clearly understood.

The present invention, whose overview is described above, is explained more specifically in detail below.

1. Catalyst for Polymerizing α-olefin

The catalyst for use in the present invention comprises a combination of component (A), component (B), and a specific component (C). The term "comprises acombinationof" referred herein does not signify that the components are only restricted to the ones enumerated herein (that is, component (A), component (B), and a specific component (C)), but that other components are allowed to coexist so long as they do not impair the effect of the present invention.

(1) Solid Catalyst Component (Component (A))

The catalyst of the present invention is a catalyst for polymerizing α-olefin comprising a combination of (A) a solid catalyst component containing magnesium, titanium, and a halogen as an essential component; (B) an organoaluminum compound; and (C) a compound containing a C(=O)N bond.

Further preferably, the component (A) may contain an electron donor as component (E).

As the component (A), preferably, a contact product of a specific solid component (component (A1)) and a specific silicon compound (component (A2)) is used. More preferably used as the component (A) is a contact product of a specific solid component (component (A1)), a specific silicon compound (component (A2)), and a specific organoaluminum compound (component (A3)). Furthermore, preferably, the component (A) may contain an electron donor as component (E). (The arbitrarily used electron donor as component (E) may be selected from the same group as that used arbitrarily for component (A1)). The component (A) as described above according to the present invention allows the coexistence of the components other than the aforementioned three components, so long as they are in conformity with the objectives of the present invention.

1) Component (A1)

The solid component for use in the present invention is a solid component for stereoregular polymerization of α-olefin, which contains titanium, magnesium, and a halogen as an essential component. The term "containing as an essential component" referred here indicates that the component may contain, in addition to the three components enumerated above, other elements in conformity with the objectives of the present invention, that these elements may each exist as an arbitrary compound in conformity with the objectives of the present invention, and that these elements may exist bonded to each other.

The solid component containing titanium, magnesium, and a halogen itself is a known one.

As the magnesium compounds for use as the magnesium source in the present invention, there may be mentioned magnesium dihalide, dialkoxymagnesium, alkoxymagnesium halide, magnesium oxyhalide, dialkylmagnesium, alkylmagnesium halide, allyloxymagnesium, allyloxymagnesium halide, metallic magnesium, magnesium oxide, magnesium hydroxide, carboxylates of magnesium, and the like.

Among them, preferred are the magnesium compounds represented by $Mg(OR^{11})_{2-n}X_n$ (where, $R^{11}$ represents a hydrocarbon group, preferably such containing from about 1 to 10 carbon atoms; X represents a halogen; and n is $0 \leq n \leq 2$), such as magnesium dihalide, dialkoxymagnesium, alkoxymagnesium halide, and the like; and more preferred is magnesium dihalide.

As the titanium compounds for use as the titanium source, mentioned are the compounds represented by the general formula $Ti(OR^{12})_{4-p}X_p$ (where, $R^{12}$ represents a hydrocarbon group, preferably such containing from about 1 to 10 carbon atoms; X represents a halogen; and p is $0 \leq p \leq 4$). Preferred among them are the tetravalent titanium compounds, and more preferred are the tetravalent titanium compounds containing halogen.

Specific examples include $TiCl_4$, $TiBr_4$, $Ti(OC_2H_5)Cl_3$, $Ti(OC_2H_5)_2Cl_2$, $Ti(OC_2H_5)_3Cl$, $Ti(O-iC_3H_7)Cl_3$, $Ti(O-n C_4H_9)Cl_3$, $Ti(O-nC_4H_9)_2Cl_2$, $Ti(OC_2H_5)Br_3$, $Ti(OC_2H_5)(O-nC_4H_9)_2Cl$, $Ti(O-nC_4H_9)_3Cl$, $Ti(OC_6H_5)Cl_3$, $Ti(O-i C_4H_9)_2Cl_2$, $Ti(OC_5H_{11})Cl_3$, $Ti(OC_6H_{13})Cl_3$, $Ti(OC_2H_5)_4$, $Ti(O-nC_3H_7)_4$, $Ti(O-nC_4H_9)_4$, $Ti(O-iC_4H_9)_4$, $Ti(O-nC_6H_{13})_4$, $Ti(O-nC_8H_{17})_4$, $Ti(OCH_2CH(C_2H_5)C_4H_9)_4$, and the like.

Furthermore, a molecular compound reacted with an electron donor described hereinafter can be used for $TiX'_4$ (where, X' represents a halogen) as the titanium source. As the specific examples for such molecular compounds, there can be mentioned $TiCl_4 \cdot CH_3COC_2H_5$, $TiCl_4 \cdot CH_3CO_2C_2H_5$, $TiCl_4 \cdot C_6H_5NO_2$, $TiCl_4 \cdot CH_3COCl$, $TiCl_4 \cdot C_6H_5COCl$, $TiCl_4 \cdot C_6H_5CO_2C_2H_5$, $TiCl_4 \cdot ClCOC_2H_5$, $TiCl_4 \cdot C_4H_4O$, and the like.

Further, also usable are titanium compounds such as $TiCl_3$ (including those obtained by reducing $TiCl_4$ with hydrogen, with metallic aluminum or with an organometallic compound, and the like), $TiBr_3$, $Ti(OC_2H_5)Cl_2$, $TiCl_2$, dicyclopentadienyltitanium dichloride, dicyclopentadienyltitanium trichloride, and the like.

Among the titanium compounds above, preferred are $TiCl_4$, $Ti(OC_4H_9)_4$, $Ti(OC_2H_5)Cl_3$, and the like, and more preferred are $TiCl_4$ and $Ti(OC_4H_9)_4$.

The halogen is generally supplied from the halogen compounds of magnesium and(or) titanium, however, it may be supplied from other halogen sources such as known halogenating agents, for instance, the halides of aluminum, e.g., $AlCl_3$, $AlBr_3$, $AlI_3$, $EtAlCl_2$, $Et_2AlCl$, etc.; the halides of boron, e.g., $BCl_3$, $BBr_3$, $BI_3$, etc.; the halides of silicon, e.g., $SiCl_4$, $MeSiCl_3$, etc.; the halides of phosphorus, e.g., $PCl_3$, $PCl_5$, etc.; the halides of tungsten, e.g., $WCl_6$, etc.; the halides of molybdenum, e.g., $MoCl_5$, etc. The halogen contained in the catalyst component may be fluorine, chlorine, bromine, iodine, or a mixture thereof, and particularly preferred is chlorine.

Furthermore, in the case of producing the solid component of component (A), an electron donor as component (E) may be used as an internal donor for arbitrary component. In case the component (A) is contacted with component (A2), or component (A2) and component (A3), the electron donor as component (E) is preferably contained in component (A1)

As the electron donor of component (E) (Internal donor) for use in the production of the solid component, there can be exemplified alcohols, phenols, ketones, aldehydes, carboxylic acids, esters of organic acids and inorganic acids, ethers, acid amides, oxygen-containing electron donors such as acid anhydrides, nitrogen-containing electron donors such as ammonia, amine, nitrile, and isocyanate, sulfur-containing electron donors such as esters of sulfonic acid, and the like.

More specifically, there can be mentioned (a) alcohols having 1 to 18 carbon atoms, such as methanol, ethanol, propanol, butanol, pentanol, hexanol, octanol, dodecanol, octadecyl alcohol, benzyl alcohol, phenyl ethyl alcohol, isopropyl benzyl alcohol, ethylene glycol, propylene glycol, 1,3-propanediol, and the like.

(b) Phenols having 6 to 25 carbon atoms, which may have an alkyl group, such as phenol, cresol, xylenol, ethyl phenol, propylphenol, isopropylphenol, nonylphenol, naphthol, 1,1'-bi-2-naphthol, and the like.

(c) Ketones having 3 to 15 carbon atoms, such as acetone, methyl ethyl ketone, methyl isobutyl ketone, acetophenone, benzophenone, acetylacetone, and the like.

(d) Aldehydes having 2 to 15 carbon atoms, such as acetoaldehyde, propionaldehyde, octylaldehyde, benzaldehyde, tolualdehyde, naphthaldehyde, and the like.

(e) Organic acid esters having 2 to 20 carbon atoms, such as organic acid monoesters, e.g., methyl formate, methyl acetate, ethyl acetate, vinyl acetate, propyl acetate, octyl acetate, cyclohexyl acetate, butyl acetate cellosolve, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, cyclohexyl benzoate, phenyl benzoate, benzyl benzoate, butyl benzoate cellosolve, methyl toluylate, ethyl toluylate, ethyl ethylbenzoate, ethyl anisate, ethyl ethoxybenzoate, γ-butyrolactone, α-valerolactone, coumarin, etc.; or esters of multivalent organic acids, e.g., diethyl phthalate, dibutyl phthalate, diisobutyl phthalate, diethyl succinate, dibutyl 2,3-diethyl-succinate, dibutyl 2,3-diisopropyl-succinate, dibutyl tartarate, dibutyl maleate, diethyl 1,2-cyclohexanecarboxylate, ethylene carbonate, norbornanedienyl-1,2-dimethyl carboxylate, n-hexyl cyclopropane-1,2-dicarboxylate, diethyl 1,1-cyclobutanedicarboxylate, etc.

(f) Inorganic acid esters such as silicic acid esters, e.g., ethyl silicate, butyl silicate, and the like.

(g) Acid Halides having 2 to 15 carbon atoms, such as acetyl chloride, benzoyl chloride, toluylic acid chloride, anisic acid chloride, phthaloyl chloride, isophthaloyl chloride, and the like.

(h) Ethers having 2 to 20 carbon atoms, such as ethyl ether, isopropyl ether, butyl ether, amyl ether, tetrahydrofuran, anisole, diphenyl ether, 2,2'-dimethoxy-1,1'-binaphthalene, 1,3-dimethoxypropane, 2,2-dimethyl-1,3-dimethoxypropane, 2,2-diisopropyl-1,3-dimethoxypropane, 2,2-diisobutyl-1,3-dimethoxypropane, 2-isopropyl-2-isobutyl-1,3-dimethoxypropane, 2-isopropyl-2-s-butyl-1,3-dimethoxypropane, 2-t-butyl-2-methyl-1,3-dimethoxypropane, 2-t-butyl-2-isopropyl-1,3-dimethoxypropane, 2,2-dicyclopentyl-1,3-dimethoxypropane, 2,2-dicyclohexyl-1,3-dimethoxypropane, 2,2-diphenyl-1,3-dimethoxypropane, 1,3-diethoxypropane, 2,2-dimethyl-1,3-diethoxypropane, 1,3-dipropoxypropane, 1,3-dibutoxypropane, 2,2-diisopropyl-1,3-diethoxypropane, 1,2,3-trimethoxypropane, 1,1,1-trimethoxymethyl-ethane, and the like.

(i) Acid amides such as acetamide, benzoic acid amide, toluic acid amide, and the like.

(j) Amines such as ethylamine, diethylamine, tributylamine, piperidine, aniline, pyridine, picoline, tetramethylethylenediamine, and the like.

(k) Nitriles such as acetonitrile, benzonitrile, tolunitrile, and the like.

(l) Alkoxyester compounds such as ethyl 2-(ethoxymethyl)-benzoate, ethyl 2-(t-butoxymethyl)-benzoate, ethyl 3-ethoxy-2-phenylpropionate, ethyl 3-ethoxypropionate, ethyl 3-ethoxyl-2-s-butylpropionate, ethyl 3-ethoxy-2-t-butylpropionate, and the like.

(m) Ketoester compounds such as ethyl 2-benzoylbenzoate, ethyl 2-(4'-methylbenzoyl)benzoate, ethyl 2-benzoyl-4,5-dimethylbenzoate, and the like.

(n) Sulfonic acid esters such as methyl benzenesulfonate, ethyl benzenesulfonate, ethyl p-toluenesulfonate, isopropyl p-toluenesulfonate, n-butyl p-toluenesulfonate, s-butyl p-toluenesulfonate, and the like.

Two or more types of the electron donors may be used. Preferred among them are the organic ester compounds, acid halide compounds, and ether compounds, and particularly preferred are the phthalic acid diester compounds, ester compounds of acetic acid cellosolve, phthalic acid dihalide compounds, diester compounds of succinic acid, and aliphatic or aromatic diether compounds.

2) Component (A2)

Preferred embodiments of silicon compound components for use in the present invention are those represented by the following formula:

$$R^8R^9_{3-m}Si(OR^{10})_m$$

(wherein $R^8$ represents an aliphatic hydrocarbon group, an alicyclic hydrocarbon group, or a hetero atom-containing hydrocarbon group; $R^9$ represents an aliphatic hydrocarbon group, an alicyclic hydrocarbon group, a hetero atom-containing hydrocarbon group, a halogen, or hydrogen; $R^{10}$ represents a hydrocarbon group; and m is $1 \leq m \leq 3$).

In case $R^8$ is an aliphatic hydrocarbon group, it is preferably a branched aliphatic hydrocarbon group having 3 to 10 carbon atoms; preferred are i-propyl group, i-butyl group, t-butyl group, i-hexyl group, texyl group, and the like, and more preferred among them is t-butyl group. Further, in case $R^8$ is a cyclic aliphatic hydrocarbon group, it generally has 4 to 20 carbon atoms, and preferably, 5 to 10 carbon atoms; mentioned as preferable are cyclobutyl group, cyclopentyl group, cyclohexyl group, cyclooctyl group, and the like, and more preferable among them are cyclopentyl group and cyclohexyl group. The hetero atoms that can be included in $R^8$ are nitrogen, oxygen, silicon, phosphorus, and sulfur, in which more preferable are nitrogen and oxygen.

$R^9$ represents an aliphatic hydrocarbon group, an alicyclic hydrocarbon group, a hetero atom-containing hydrocarbon group, a halogen, or hydrogen. More specifically, it represents hydrogen, a halogen group such as chlorine, bromine, iodine, etc., or a hydrocarbon group generally having 1 to 20 carbon atoms, preferably 1 to 10 carbon atoms, in which preferably mentioned are methyl group, ethyl group, n-propyl group, i-propyl group, n-butyl group, i-butyl group, t-butyl group, n-hexyl group, i-hexyl group, cyclopentyl group, cyclohexyl group, and the like, and among them, more preferably mentioned for increasing stereoregularity are methyl group, ethyl group, n-propyl group, i-propyl group, t-butyl group, n-hexyl group, cyclopentyl group, cyclohexyl group, and the like.

$R^{10}$ represents a hydrocarbon group generally having 1 to 20 carbon atoms, preferably 1 to 10 carbon atoms, and more preferably, 1 to 5 carbon atoms; preferably mentioned are methyl group, ethyl group, n-propyl group, i-propyl group, n-butyl group, i-butyl group, t-butyl group, and the like, and more preferred among them are methyl group and ethyl group.

Specific examples of the silicon compound components for use in the present invention are the following:

(CH₃)₃CSi(CH₃)(OCH₃)₂, (CH₃)₃CSi(CH(CH₃)₂)(OCH₃)₂, (CH₃)₃CSi(CH₃)(OC₂H₅)₂, (CH₃)₃CSi(C₂H₅)(OCH₃)₂, (CH₃)₃CSi (n-C₃H₇)(OCH₃)₂, (CH₃)₃CSi (n-C₆H₁₃) (OCH₃)₂, (C₂H₅)₃CSi(CH₃)(OCH₃)₂, (CH₃)(C₂H₅)₂ CHSi(CH₃)(OCH₃)₂, ((CH₃)₂CHCH₂)₂Si(OCH₃)₂, (C₂H₅)(CH₃)₂CSi(CH₃)(OCH₃)₂, (C₂H₅)(CH₃)₂CSi (CH₃)(OC₂H₅)₂, (CH₃)₃CSi(OCH₃)₃, (CH₃)₃CSi (OC₂H₅)₃, (CH₃)(C₂H₅)CHSi(OCH₃)₃, (CH₃)₂CH(CH₃)₂ CSi(CH₃)(OCH₃)₂, ((CH₃)₃C)₂Si(OCH₃)₂, (C₂H₅) (CH₃)₂ CSi(OCH₃)₃, (C₂H₅)(CH₃)₂CSi(OC₂H₅)₃, (CH₃)₃ CSi(OC(CH₃)₃)(OCH₃)₂, ((CH₃)₂CH)₂Si(OCH₃)₂, ((CH₃)₂CH)₂Si(OC₂H₅)₂, (C₅H₉)₂Si(OCH₃)₂, (C₅H₉)₂Si (OC₂H₅)₂, (C₅H₉)(CH₃)Si(OCH₃)₂, (C₅H₉)((CH₃)₂ CHCH₂)Si(OCH₃)₂, (C₆H₁₁)Si(CH₃)(OCH₃)₂, (C₆H₁₁)₂ Si(OCH₃)₂, (C₆H₁₁)((CH₃)₂CHCH₂)Si(OCH₃)₂, ((CH₃)₂ CHCH₂)((C₂H₅)(CH₃)CH)Si(OCH₃)₂, ((CH₃)₂CHCH₂) ((CH₃)₂CH)Si(OC₅H₁₁)₂, HC(CH₃)₂C(CH₃)₂Si(CH₃) (OCH₃)₂, HC(CH₃)₂C(CH₃)₂Si(CH₃)(OC₂H₅)₂, HC(CH₃)₂C(CH₃)₂Si(OCH₃)₃, HC(CH₃)₂C(CH₃)₂Si (OC₂H₅)₃, (CH₃)₃CSiH(OCH₃)₂, (CH₃)₃CSiCl(OCH₃)₂, (CH₃)₃CSiF(OCH₃)₂, (CH₃)₃CSi(OCH(CH₃)₂)(OCH₃)₂, (CH₃)₃CSi(OC(CH₃)₃) (OCH₃)₂, (CH₃)₃CSi(N(C₂H₅)₂)(OCH₃)₂, (CH₃)₃CSi (NC₄H₈)(OCH₃)₂, (CH₃)₃CSi(NC₅H₁₀)(OCH₃)₂, (CH₃)₃ CSi(NC₉H₁₆)(OCH₃)₂, ((CH₃)₂HCO)₂Si(OCH₃)₂, ((CH₃)₂CO)₂Si(OCH₃)₂, (C₆H₁₁O)₂Si(OCH₃)₂, (4-CH₃—C₆H₁₁O)₂Si(OCH₃)₂, (4-C₂H₅—C₆H₁₁O)₂Si (OCH₃)₂, (4-C₄H₉—C₆H₁₁O)₂Si(OCH₃)₂, (C₁₀H₁₇O)₂Si (OCH₃)₂, ((C₂H₅)₂N)₂Si(OCH₃)₂, (C₄H₈)₂Si(OCH₃)₂, (C₅H₁₀N)₂Si(OCH₃)₂, (C₉H₁₆N)₂Si(OCH₃)₂, and the like.

Mentioned as preferred among them are (CH₃)₃CSi(CH₃) (OCH₃)₂, (CH₃)₃CSi(CH(CH₃)₂)(OCH₃)₂, (CH₃)₃CSi (CH₃)(OC₂H₅)₂, (CH₃)₃CSi (C₂H₅)(OCH₃)₂, (CH₃)₃CSi(n-C₃H₇)(OCH₃)₂, (CH₃)₃CSi(n-C₆H₁₃)(OCH₃)₂, (C₅H₉)₂Si (OCH₃)₂, (C₅H₉)₂Si(OC₂H₅)₂, (C₆H₁₁)Si(CH₃)(OCH₃)₂, (C₆H₁₁)₂Si(OCH₃)₂, and the like.

Two or more types of the silicon compounds above can be used.

3) Component (A3)

The organoaluminum compounds (component (A3)) preferably used in the present invention are used by bringing them into contact with the solid component. The term "bringing into contact" herein does not signify that the contact time is only once, but allows bringing the organoaluminum compounds (component (A3)) into contact repeatedly in such a range that the effect of the present invention is not impaired thereby.

As specific examples of the organoaluminum compounds (component (A3)), there are mentioned such represented by $R^{13}AlR^{14}R^{15}$ and/or $R^{16}{}_{2-n}R^{17}AlX_n$ (where, $R^{13}$, $R^{14}$, $R^{15}$, $R^{16}$, and $R^{17}$ each independently represent a hydrocarbon group having 1 to 20 carbon atoms, preferably, about 1 to 10 carbon atoms; X represents a hydrogen or a halogen, and n is $0<n<2$).

Specifically mentioned are (a) a trialkylaluminum such as trimetylaluminum, triethylaluminum, tri-n-propylaluminum, triisopropylaluminum, diisopropylmethylaluminum, diisopropylethylaluminum, tri-n-butylaluminum, triisobutylaluminum, diisobutylmethylaluminum, diisobutylethylaluminum, tri-s-butylaluminum, di-s-butylmethylaluminum, di-s-butylethylaluminum, di-s-butylpropylaluminum, s-butyldimethylaluminum, s-butyldiethylaluminum, s-butyldipropylaluminum, tri-t-butylaluminum, di-t-butylmethylaluminum, di-t-butylethylaluminum, and the like;

(b) an alkylaluminum halide such as dimethylaluminum monochloride, diethylaluminum monochloride, diisopropylaluminum monochloride, dibutylaluminum monochloride, diisobutylaluminum monochloride, di-s-butylaluminum monochloride, di-t-butylaluminum monochloride, dimethylaluminum monobromide, diethylaluminum monobromide, diisopropylaluminum monobromide, dibutylaluminum monobromide, di-s-butylaluminum monobromide, di-t-butylaluminum monobromide, and the like; and (c) an alkylaluminum hydride such as diethylaluminum hydride, diisobutylaluminum hydride, di-n-octylaluminum hydride, and the like.

Two or more types of organoaluminum compounds above may be used.

Preferred among them are trimetylaluminum, triethylaluminum, triisopropylaluminum, triisobutylaluminum, tri-s-butylaluminum, tri-t-butylaluminum; or diethylaluminum monochloride, diisopropylaluminum monochloride, dibutylaluminum monochloride, diisobutylaluminum monochloride, di-s-butylaluminum monochloride, di-t-butylaluminum monochloride, diethylaluminum hydride, and diisobutylaluminum hydride.

4) Other Arbitrary Components

Furthermore, as described above, arbitrary component other than the components above can be included in producing the component (A) of the present invention; properly used as the arbitrary components are the compounds enumerated below.

(a) Vinylsilane Compounds

Vinylsilane compounds show structures as such that at least one of the hydrogen atoms of monosilane ($SiH_4$) is substituted by a vinyl group ($CH_2=CH-$), and some of the remaining hydrogen atoms are substituted by a halogen (preferably Cl), an alkyl group (preferably a hydrocarbon group having 1 to 12 carbon atoms), and aryl group (preferably phenyl group), an alkoxy group (preferably an alkoxy group having 1 to 12 carbon atoms), and the like.

More specifically, examples include $CH_2=CH-SiH_3$, $CH_2=CH-SiH_2(CH_3)$, $CH_2=CH-SiH(CH_3)_2$, $CH_2=CH-Si(CH_3)_3$, $CH_2=CH-SiCl_3$, $CH_2=CH-SiCl_2(CH_3)$, $CH_2=CH-SiCl(CH_3)_2$, $CH_2=CH-SiH(Cl)(CH_3)$, $CH_2=CH-Si(C_2H_5)_3$, $CH_2=CH-SiCl(C_2H_5)_2$, $CH_2=CH-Si(CH_3)_2(C_2H_5)$, $CH_2=CH-Si(CH_3)(C_2H_5)_2$, $CH_2=CH-Si(n-C_4H_9)_3$, $CH_2=CH-Si(C_6H_5)_3$, $CH_2=CH-Si(CH_3)(C_6H_5)_2$, $CH_2=CH-Si(CH_3)_2(C_6H_5)$, $CH_2=CH-Si(CH_3)_2(C_6H_4CH_3)(CH_3)$, $(CH_2=CH)(CH_3)_2Si-O-Si(CH_3)_2(CH=CH_2)$, $(CH_2=CH)_2SiH_2$, $(CH_2=CH)_2SiCl_2$, $(CH_2=CH)_2Si(CH_3)_2$, $(CH_2=CH)_2Si(C_6H_5)_2$, and the like.

(b) Organometallic Compounds of Metals Belonging to Group I to Group III of the Periodic Table It is also possible to use the organometallic compounds of the metals belonging to the Group I to Group III of the periodic table (short periodic type) The organometallic compounds of the metals belonging to the Group I to Group III of the periodic table for use in the present invention contains at least one organic group-metal bond. In such a case, a representative for the organic group is a hydrocarbyl group having about 1 to 20, preferably about 1 to 6, carbon atoms. In the organometallic compound, the metal in which at least one atomic valence is occupied with an organic group, the remaining atomic valences (if any) are occupied by a hydrogen atom, a halogen atom, a hydrocarbyloxy group (the hydrocarbyl group preferably contains about 1 to 20, preferably about 1 to 6, carbon atoms), or the relevant metal bonded via an oxygen atom (specifically, in case of methylalmoxane, $-O-Al(CH_3)-$), and the like.

Specific examples of such organometallic compounds include (i) an organolithium compound such as methyllithium, n-butyllithium, t-butyllithium, etc.; (ii) an organomagnesium compound such as butylethylmagnesium, dibutylmagnesium, hexylethylmagnesium, butylmagnesium chloride, t-butylmagnesium bromide, etc.; and (iii) an organozinc compound such as diethylzinc, dibutylzinc, etc.

Two or more types of the arbitrary components (a) and (b) above may be used in combination. Furthermore, in such a case, there may coexist a known halogenating agent such as a halide of titanium, e.g., $TiCl_4$, etc.; a halide of tungsten, e.g., $WCl_6$, etc.; a halide of molybdenum, e.g., $MoCl_5$, etc.; and the like. The effect of the present invention can be increased by using such arbitrary components.

5) Production of Component (A)

The component (A) can be produced by bringing each of the components constituting the component (A), or if necessary, the arbitrary components above, either stepwise or at one time, in contact with each other, and by rinsing at the intermediate stage and/or at the final stage with an organic solvent, such as a hydrocarbon solvent or a halogenated hydrocarbon solvent.

In such a case, the production can be carried out by a method comprising producing first the solid product (A1) containing titanium, magnesium, and halogen as an essential component, and then bringing it into contact with the silicon compound (A2) represented by the general formula above and the organoaluminum (A3) either simultaneously or sequentially (so-called sequential method), or by a method comprising producing the component (A) at once by incorporating the silicon compound component (A2) during the process of forming the solid product containing titanium, magnesium, and halogen as an essential component (so-called single-step method). The former is the preferred method.

Although the method above must be carried out under the absence of oxygen, the contact conditions of the each of the components constituting the component (A) above is arbitrary so long as the effect of the present invention is obtained; however, in general, the following conditions are preferred. The contact temperature is about −50 to 200° C., preferably, 0 to 100° C. Concerning the method for contact, there are mechanical methods such as those using rotary ball mill, vibration mill, jet mill, grinders using stirring media, and the like, or stirring method in the presence of an inert diluting agent, and the like. As the inert diluting agent for use in this method, mentioned are the aliphatic or aromatic hydrocarbons, aliphatic or aromatic halogenated hydrocarbons, polysiloxane, and the like.

The amount ratio of the components constituting the component (A) can be set arbitrarily so long as the effect of the present invention is observed; however, in general, it is preferably set in the range as follows. The amount used for the titanium compounds is set to 0.0001 to 1000, preferably, 0.01 to 10, in molar ratio with respect to the amount of the magnesium compound used. In case a compound for halogen source is used, the amount for use is set in the range of 0.01 to 1000, preferably, 0.1 to 100, in molar ratio with respect to the amount of the magnesium, irrespective of whether the titanium compound and (or) the magnesium compound contain a halogen or not. The amount of the silicon compound component to be used for the component (A2) is in the range of 0.01 to 1000, preferably, 0.1 to 100, in atomic ratio (silicon/titanium) of silicon with respect to the titanium component constituting the component (A1). The amount of organoaluminum of the component (A3) to be used with respect to the titanium component constituting the component (A1) is generally in the range of 0.1 to 100 mol/mol in atomic ratio (aluminum/titanium), and preferably, in the range of 1 to 50 mol/mol.

In case vinylsilane compound is used as an arbitrary component, the amount of use is favorably set in a range of 0.001 to 1000, preferably, 0.01 to 100, in molar ratio with respect to the titanium compound constituting component (A1). In case an organometallic compound is used as an arbitrary component, the amount of use is favorably set in a range of 0.001 to 100, preferably, 0.01 to 10, in molar ratio with respect to the aforementioned magnesium compound. In case an electron donor is used as an arbitrary component, the amount of use is favorably set in a range of 0.001 to 10, preferably, 0.01 to 5, in molar ratio with respect to the aforementioned magnesium compound.

Component (A) is produced, for instance, by production methods as follows, if necessary, by using other components such as the electron donors and the like.

(a) A method comprising bringing magnesium halide compound, if necessary, together with an electron donor into contact with a titanium-containing compound and/or a silicon compound component.

(b) A method comprising treating alumina or magnesia with halogenated phosphorus compound, and then bringing it into contact with halogenated magnesium, an electron donor, a titanium halogen-containing compound and/or a silicon compound component.

(c) A method comprising obtaining a solid component by bringing magnesium halide compound into contact with titanium tetraalkoxide and a specific polymer silicon compound, then bringing the resulting solid component into contact with a titanium halide compound and/or a silicon halide compound and further contacting it with a silicon compound component after rinsing with an inert organic solvent, or with each of the components separately.

As the polymer silicon compound above, properly used is such represented by the following formula:

(where, $R^{18}$ represents a hydrocarbon group having 1 to 10 carbon atoms, and q represents the degree of polymerization as such that the polymer silicon compound yields a viscosity of about 1 to 100 centistokes). More specifically, preferred are methyl hydrogenpolysiloxane, ethyl hydrogenpolysiloxane, phenyl hydrogenpolysiloxane, cyclohexyl hydrogenpolysiloxane, 1,3,5,7-tetramethylcyclotetrasiloxane, 1,3,5,7,9-pentamethylcyclopentasiloxane, and the like.

(d) A method comprising dissolving a magnesium compound with titanium tetraalkoxide and/or an electron donor, and after precipitating solid component with a halogenating agent or a titanium halide compound, bringing a titanium compound and/or a silicon compound component into contact or bringing them each separately into contact with the solid component.

(e) A method comprising reacting an organomagnesium compound such as Grignard reagent and the like with a halogenating agent, reducing agent, and the like; bringing an electron donor in contact therewith depending on necessities; and bringing a titanium compound and/or a silicon compound component into contact or bringing them each separately into contact with the resulting product.

(f) A method comprising bringing an alkoxymagnesium compound into contact with a halogenating agent and/or a titanium halide compound in the presence or in the absence of an electron donor, and then bringing a titanium compound and/or a silicon compound component into contact or bringing them each separately into contact with the resulting product.

Among the production methods above, preferred are the methods (a), (c), (d), and (f). The component (A) can be rinsed in the intermediate and/or the final stage of production using an inert organic solvent, such as an aliphatic or an aromatic hydrocarbon solvent (for example, hexane, heptane, toluene, cyclohexane, and the like), or a halogenated hydrocarbon solvent (for example, n-butyl chloride, 1,2-dichloroethylene, carbon tetrachloride, chlorobenzene, and the like).

As the component (A) for use in the present invention, there can be used those once subjected to a pre-polymerization step, which comprises carrying out polymerization by bringing a compound containing a vinyl-group, such as olefins, diene compounds, styrenes, etc., into contact. As specific examples of the olefins for use in the prepolymerization, mentioned are, for example, such having 2 to 20 carbon atoms, such as ethylene, propylene, 1-butene, 3-methyl-1-butene, 1-pentene, 1-hexene, 4-methyl-1-pentene, 1-octene, 1-decene, 1-undecene, 1-eicosene, and the like; as specific examples of the diene compounds, mentioned are 1,3-butadiene, isoprene, 1,3-pentadiene, 1,4-pentadiene, 2,4-pentadiene, 1,4-hexadiene, 1,5-hexadiene, cis-2, trans-4-hexadiene, trans-2, trans-4-hexadiene, 1,3-heptadiene, 1,4-heptadiene, 1,5-heptadiene, 1,6-heptadiene, 2,4-heptadiene, 2,6-octadiene, cyclopentadiene, dicyclopentadiene, 1,3-cyclohexadiene, 1,4-cyclohexadiene, 1,3-cycloheptadiene, 4-methyl-1,4-hexadiene, 5-methyl-1,4-hexadiene, 1,9-decadiene, 1,13-tetradecadiene, p-divinylbenzene, m-divinylbenzene, o-divinylbenzene, and the like. Further, as specific examples of styrenes, mentioned are styrene, α-methylstyrene, allylbenzene, chlorostyrene, and the like.

The conditions of reacting the titanium component of the component (A1) with the vinyl-group containing compound above may be set arbitrarily so long as the effect of the present invention is observed, however, in general, preferred conditions are in the following range. The amount of pre-polymerization is 0.001 to 100 grams, preferably, 0.1 to 50 grams, and more preferably, 0.5 to 10 grams per 1 gram of the titanium solid component. The reaction temperature during prepolymerization is −150 to 150° C., preferably, 0 to 100° C. Further, preferred is a prepolymerization temperature lower than that at "main polymerization", i.e., than the polymerization temperature at polymerizing α-olefin. In general, the reaction is preferably carried out under stirring, and in this instance, it is also possible to carry out the reaction in the presence of an inert solvent such as hexane, heptane, and the like. Furthermore, prepolymerization can be performed at the same time the component (A1), component (A2), and component (A3) are brought into contact with each other.

(2) Organoaluminum Compound (Component (B))

As the organoaluminum compound (component (B)) for use in the present invention, there are those represented by $R^{19}{}_{3-r}AlX_r$, $R^{20}{}_{3-s}Al(OR^{21})_s$ (where, $R^{19}$ and $R^{20}$ are each a hydrocarbon group having 1 to 20 carbon atoms or a hydrogen atom, $R^{21}$ is a hydrocarbon group, X is a halogen, and r and s are each $0 \leq r < 3$ and $0 < s < 3$).

Specifically mentioned are (a) a trialkylaluminum such as trimethylaluminum, triethylaluminum, triisobutylaluminum, tri-n-hexylaluminum, tri-n-octylaluminum, tri-n-decylaluminum, etc.; (b) an alkylaluminum halide such as diethylaluminum monochloride, diisobutylaluminum monochloride, ethylaluminum sesquichloride, ethylaluminum dichloride, etc.; (c) an alkylaluminum hydride such as diethylaluminum hydride, diisobutylaluminum hydride, etc.; (d) an alkylaluminum alkoxide such as diethylaluminum ethoxide, diethylaluminum phenoxide, etc. Furthermore, as compounds similar to the above, there can be used an organoaluminum compound in which two or more aluminum are bonded via an oxygen atom or a nitrogen atom. Specifically, there can be mentioned (e) $(C_2H_5)_2AlOAl(C_2H_5)_2$, $(C_2H_5)_2AlN(C_2H_5)_2Al(C_2H_5)_2$, methyl almoxane, isobutyl almoxane, methylisobutyl almoxane, etc.

Plural organoaluminum compounds (a) to (e) above may be used together, or other organometallic compounds, for instance, an organometallic compound such as organozinc and the like represented by $R^{22}{}_{2-t}Zn(OR^{23})_t$ (where, $R^{22}$ and $R^{23}$ are each a hydrocarbon group having 1 to 20 carbon atoms, which may be the same or different, and t is $0 \leq t \leq 2$), may be used together. For instance, there are mentioned a combination of triethylaluminum and diethylaluminum ethoxide, a combination of diethylaluminum monochloride and diethylaluminum ethoxide, a combination of ethylaluminum dichloride and ethylaluminum diethoxide, a combination of triethylaluminum, diethylaluminum ethoxide and diethylaluminum monochloride, a combination of triethylaluminum and diethylzinc, and the like.

The organoaluminum compound as component (B) and the titanium component contained in the solid catalyst component of component (A) is generally used at a ratio of Al/Ti=1 to 1000 mol/mol, and preferably, is used at Al/Ti=10 to 500 mol/mol.

(3) Compound Containing C(=O)N Bond (Component (C))

The compound containing C(=O)N bond for use in the present invention is preferably selected from the following compounds (where, $R^1$ to $R^7$ each represent an aliphatic hydrocarbon group, an alicyclic hydrocarbon group, an aromatic hydrocarbon group, or a hetero atom-containing hydrocarbon group having 1 or more carbon atoms, in which the groups arbitrarily selected from $R^1$ to $R^3$ and the groups arbitrarily selected from $R^4$ to $R^7$ may be combined to form a ring structure).

In case $R^1$ to $R^7$ are each an aliphatic hydrocarbon group or an alicyclic hydrocarbon group, it is preferred that they are structurally small in volume, such as an alkyl group, a cycloalkyl group, etc., having 1 to 20, more preferably, 1 to 10, carbon atoms. Specifically mentioned are methyl group, ethyl group, vinyl group, allyl group, n-propyl group, i-propyl group, n-butyl group, i-butyl group, t-butyl group, n-hexyl group, i-hexyl group, cyclopropyl group, cyclobutyl group, cyclopentyl group, cyclohexyl group, cyclooctyl group, and the like, and particularly preferred are methyl group, ethyl group, and n-propyl group. In case $R^1$ to $R^7$ are each an aromatic hydrocarbon group, it is preferred that they are non-substituted aromatic hydrocarbon group and the like having 6 to 20, more preferably, 6 to 12, carbon atoms. Such substituents are preferable because they are expected to have properties as such that carbonyl groups are more easily coordinated by the stressed ring structure. Specifically mentioned are a phenyl group, a biphenyl group, an indenyl group, and a fluorenyl group, and particularly preferred are a phenyl group, a biphenyl group, and an indenyl group. Hetero atoms that might be included in $R^1$ to $R^7$ are nitrogen, oxygen, silicon, phosphorus, and sulfur, in which nitrogen and oxygen are more preferred. Further, the groups arbitrarily selected from $R^1$ to $R^3$ and the groups arbitrarily selected from $R^4$ to $R^7$ may be combined to form a ring structure; favorably, $R^1$ and $R^2$, $R^1$ and $R^3$, $R^4$ and $R^5$, $R^4$ and $R^6$, or $R^6$ and $R^7$ are preferably combined to form a ring structure, and more preferably, $R^1$ and $R^3$, and $R^4$ and $R^6$ are combined to form a ring structure. Particularly preferably, component (C) is a cyclic amide compound, in which $R^1$ and $R^3$ are combined to form a 5- to 7-membered ring structure, or a urea compound, in which $R^4$ and $R^6$, $R^5$ and $R^7$ are of the same saturated hydrocarbon group, or a urea compound, in which $R^4$ and $R^6$ are combined to form a 5- to 7-membered ring structure.

More specifically, the following amide compounds and urea compounds can be provided as examples.

Thus, there can be enumerated (a) amide compounds such as N,N-dimethylacetamide, N,N-dimethylpropionamide, N,N-diethylacetamide, N,N-dimethylbenzamide, N-methyl-N-phenylacetamide, 1-methyl-2-pyrrolidinone, 1-methyl-2-piperidinone, 1-ethyl-2-pyrrolidinone, 1-dodecyl-2-pyrrolidinone, 1-cyclohexyl-2-pyrrolidinone, 1-phenyl-2-pyrrolidinone, 1-methyl-2-pyridone, N-methyl-ε-caprolactam, and the like; and (b) urea compounds such as tetramethylurea, tetraethylurea, tetrabutylurea, N,N'-dimethyl-N,N'-diphenylurea, bis(tetramethylene)urea, 1,3-dimethyl-2-imidazolidinone, 1,3-diacetyl-2-imidazolidinone, 1,3-dimethyl-3,4,5,6-tetrahydro-2(1H)-pyrimidinone, 1,3-dimethyl-barbituric acid, and the like.

Among the compounds having C(=O)N bonds above, preferred are N,N-dimethylpropionamide, tetramethylurea, 1,3-dimethyl-2-imidazolidinone, 1,3-dimethyl-3,4,5,6-tetrahydro-2(1H)-pyrimidinone, 1-methyl-2-pyrrolidinone, 1-ethyl-2-pyrrolidinone, 1-dodecyl-2-pyrrolidinone, and 1-cyclohexyl-2-pyrrolidinone; particularly preferred among them are tetramethylurea, 1,3-dimethyl-2-imidazolidinone, 1-methyl-2-pyrrolidinone, and 1-ethyl-2-pyrrolidinone.

All of the compounds having C(=O)N bonds above contain N atom, and are thereby small in volume, therefore, these carbonyl groups can selectively coordinate to poison at the active point for amorphous component. Accordingly, it is presumed that $R^1$ to $R^7$, which are near the carbonyl group, exhibit excellent effect when they are structurally small in size, or when they have a stressed ring structure, which increase the coordination ability of the carbonyl group.

Further, two or more types of the compounds having C(=O)N bonds above can be used.

The amount ratio of the compounds having C(=O)N bonds above as component (C) and the organoaluminum compounds of component (B) is set to 0.001 to 1, preferably 0.005 to 0.5, in molar ratio with respect to the amount of organoaluminum compound used.

(4) Silicon compound component or compound having at least two ether bonds (component (D))

The component (D) preferably used in the present invention is a silicon compound component or a compound having at least two ether bonds. The silicon compound component is represented by the following formula:

$R^8R^9_{3-m}Si(OR^{10})_m$ (wherein $R^8$ represents an aliphatic hydrocarbon group, an alicyclic hydrocarbon group, or a hetero atom-containing hydrocarbon group; $R^9$ represents an aliphatic hydrocarbon group, an alicyclic hydrocarbon group, a hetero atom-containing hydrocarbon group, a halogen, or hydrogen; $R^{10}$ represents a hydrocarbon group; and m is $1 \leq m \leq 3$).

In case $R^8$ is an aliphatic hydrocarbon group, it is a branched hydrocarbon group having, in general, 3 to 20, preferably, 3 to 10, carbon atoms; mentioned as preferred are i-propyl group, i-butyl group, t-butyl group, i-hexyl group, and the like, and more preferred among them is t-butyl group. Further, in case $R^8$ is an alicyclic hydrocarbon group, it generally has 4 to 20, preferably, 5 to 10, carbon atoms; mentioned as preferred are cyclobutyl group, cyclopentyl group, cyclohexyl group, cyclooctyl group, and the like, and more preferred among them are cyclopentyl group and cyclohexyl group. $R^8$ may contain nitrogen, oxygen, silicon, phosphorus, and sulfur as hetero atoms, and more preferred are nitrogen and oxygen.

$R^9$ is an aliphatic hydrocarbon group, an alicyclic hydrocarbon group, a hetero atom-containing hydrocarbon group, a halogen, or hydrogen. More specifically, it represents a hydrogen, a halogen such as chlorine, bromine, iodine, and the like; or it generally has 1 to 20, preferably 1 to 10 carbon atoms, and mentioned as preferable are methyl group, ethyl group, n-propyl group, i-propyl group, n-butyl group, i-butyl group, t-butyl group, n-hexyl group, i-hexyl group, cyclo-pentyl group, cyclohexyl group, and the like, and among them, mentioned as more preferred are methyl group, ethyl group, n-propyl group, i-propyl group, t-butyl group, n-hexyl group, cyclopentyl group, cyclohexyl group, and the like.

$R^{10}$ is a hydrocarbon group generally having 1 to 20, preferably 1 to 10, and more preferably, 1 to 5 carbon atoms; preferably mentioned are methyl group, ethyl group, n-propyl group, i-propyl group, n-butyl group, i-butyl group, t-butyl group, and the like, and more preferred among them are methyl group and ethyl group.

The silicon compound component of component (D) and the silicon compound component of component (A2) are selected from the same group, and may be the same or different.

The compound having at least two ether bonds of component (D) is selected from the diether compounds that are preferred as electron donors in the solid catalyst component of component (A) or the solid component of component (A1), and may be the same or different.

Specifically mentioned are 1,3-dimethoxypropane, 2,2-dimethyl-1,3-dimethoxypropane, 2,2-diisopropyl-1,3-dimethoxypropane, 2,2-diisobutyl-1,3-dimethoxypropane, 2-isopropyl-2-isobutyl-1,3-dimethoxypropane, 2-isopropyl-2-s-butyl-1,3-dimethoxypropane, 2-t-butyl-2-methyl-1,3-dimethoxypropane, 2-t-butyl-2-isopropyl-1,3-dimethoxypropane, 2,2-dicyclopentyl-1,3-dimethoxypropane, 2,2-dicyclohexyl-1,3-dimethoxypropane, 2,2-diphenyl-1,3-dimethoxypropane, 1,3-diethoxypropane, 2,2-dimethyl-1,3-diethoxypropane, 1,3-dipropoxypropane, 1,3-dibutoxypropane, 2,2-diisopropyl-1,3-diethoxypropane, 2,2'-dimethoxy-1,1'-binaphthalene, 1,2,3-trimethoxypropane, 1,1,1-trimethoxymethyl-ethane, and the like.

The amount ratio of the silicon compound component or compound having at least two ether bonds as component (D) and the organoaluminum compound component of component (B) is favorably in a range of 0.01 to 10, preferably, 0.05 to 1, in molar ratio with respect to the amount used of the organoaluminum compound.

2. α-Olefin Polymerization

The α-olefin polymerization utilizing the novel catalyst according to the present invention can be applied to a slurry polymerization process using a hydrocarbon solvent, a liquid-phase solvent-free polymerization process substantially free of solvents, a gas-phase polymerization process, and the like. As the polymerization solvent in the case of slurry polymerization process, usable are the hydrocarbon solvents such as pentane, hexane, heptane, cyclohexane, and the like. Any method, such as continuous polymerization process, batch polymerization process, or sequential polymerization process, etc., may be adopted. The polymerization temperature is generally about 30 to 200° C., preferably 50 to 150° C. Hydrogen can be used as the molecular weight controlling agent.

The α-olefin that is polymerized with the catalyst system according to the present invention is represented by the general formula $R^{24}$—CH=CH$_2$ (where, $R^{24}$ represents a hydrocarbon group having 1 to 20 carbon atoms, which may have a branched group). Specifically mentioned are the α-olefins such as propylene, butene-1, pentene-1, hexene-1, 4-methyl-1-pentene, and the like. In addition to homopolymerization of the α-olefins above, copolymerization with monomers (for example, ethylene, α-olefin, dienes, styrenes, etc.) copolymerizable with α-olefin can be performed. The comonomers above may be used up to 15% by weight in case of random copolymerization, and up to 50% by weight in case of block copolymerization.

3. α-Olefin Polymer

The α-olefin polymer obtained by the present invention is characterized in that it contains extremely low amorphous component, exhibits high stereoregularity, and that it has favorable smell and favorable color.

In particular, the α-olefin polymer produced by bulk polymerization process contains cold xylene soluble fraction (CXS) as the amorphous component of preferably 1% by weight or lower, more preferably, 0.1 to 1% by weight, and further preferably, 0.2 to 0.7% by weight. The CXS as referred herein is obtained by the following procedure: the sample (about 5 g) is completely dissolved in xylene (300 ml) at 140° C., and then cooled to and set at 23° C. for 12 hours followed by filtration. The filtrate is evaporated and dried in vacuo at 110° C. for 2 hours. After cooling to the ambient temperature, the weight is measured.

Furthermore, the α-olefin polymer produced by slurry polymerization process preferably contains the amorphous component measured as the atactic polymer fraction of 1.2% by weight or lower, more preferably 0.1 to 0.9% by weight, and further preferably, 0.1 to 0.5% by weight. In the α-olefin polymer produced by slurry polymerization, the atactic polymer fraction as referred herein is obtained by the following procedure: After polymerization, product polymer slurry is filtrated, and the amount of polymer obtained by drying the filtrate sample, is measured. The atactic polymer fraction is calculated as the ratio of the amount of polymer dissolved in the filtrate to the total amount of polymer (% by weight).

As the stereoregularity, the amount of fraction insoluble to boiling heptane (II) is preferably 97% by weight or higher, more preferably 97 to 99.5% by weight, further preferably, 98 to 99.5% by weight, and particularly preferably, 98.5 to 99.5% by weight.

The α-olefin polymer produced by bulk phase polymerization yields a stereoregularity as expressed by fraction insoluble to boiling heptane (II) of, preferably, 97% by weight or higher, more preferably, 97 to 99.5% by weight, further preferably, 98 to 99.5% by weight, and particularly preferably, 98.5 to 99.5% by weight. The II herein is obtained by carrying out Soxhlet extraction for 3 hours using boiling heptane, and by measuring the ratio of the extraction residue thereafter.

Furthermore, the α-olefin polymer produced by slurry polymerization process yields a stereoregularity as expressed byproduct II (T-II) of, preferably, 95% by weight or higher, more preferably, 96 to 99.5% by weight, and further preferably, 97.5 to 99.5% by weight. In the α-olefin polymer produced by slurry polymerization, T-II referred herein is obtained by the following procedure: After the polymerization finished, product polymer slurry is filtrated. Polymer powder is dried, and the amount of the polymer insoluble to boiling heptane is measured. The amount of the total polymer is calculated by taking the amount of atactic PP dissolved in the filtrate into consideration, and the ratio of the fraction insoluble to boiling heptane with respect to the amount of total polymer is obtained to give the total product II (T-II).

The α-olefin polymer polymerized according to the present invention contains extremely low amount of amorphous component and yields high stereoregularity; it thereby possesses excellent properties such as high density, high stiffness and high heat resistance.

Furthermore, the α-olefin polymer can also be produced at high yield, and can be favorably applied in uses requiring high stiffness and high heat resistance, such as automobile parts, electric appliances, wrapping materials, and the like.

EXAMPLE

The present invention is described in further detail by way of examples; however, the present invention is not limited thereby.

The methods and apparatuses for measuring each of the physical properties are described below.

1) MFR

Apparatus: Melt Indexer manufactured by Takara Thermistor Instruments Co., Ltd.

Method of measurement: Evaluation was made according to JIS-K6921, under conditions of 230° C. and 21.18 N.

2) Polymer Bulk Density

The bulk density of the powder sample was measured by using an apparatus in accordance with ASTM D1895-69.

3) Cold Xylene Solubility [CXS]

Method of measurement: CXS was obtained by the following procedure: the sample (about 5 g) is completely dissolved in xylene (300 ml) at 140° C., and then cooled to and set at 23° C. for 12 hours followed by filtration. The filtrate is evaporated and dried in vacuo at 110° C. for 2 hours. After cooling to the ambient temperature, the weight is measured.

4) Atactic Polymer Quantity

In the α-olefin polymer produced by slurry polymerization, after polymerization, the product polymer slurry was filtrated, and the amount of polymer obtained by drying the filtrate sample was measured. The atactic polymer fraction was calculated as the ratio of the amount of polymer dissolved in the filtrate with respect to the total amount of polymer (% by weight).

5) Fraction Insoluble to Boiling Heptane [II]

The fraction insoluble to boiling heptane (abbreviated "II" hereinafter) was obtained by carrying out Soxhlet extraction for 3 hours using boiling heptane, and the ratio of the extraction residue was designated as II.

6) Total Product II [T-II]

In the α-olefin polymer produced by slurry polymerization, after the polymerization finished, product polymer slurry was filtrated. The fraction insoluble to boiling heptane of the dried polymer was measured. The amount of the total polymer is calculated by taking the amount of atactic PP dissolved in the filtrate into consideration, and the ratio of the fraction insoluble to boiling heptane with respect to the amount of total polymer is obtained to give the total product II (T-II).

EXAMPLE-1

Production of Component (A)

Two hundred milliliters of dried and deoxidized n-heptane was introduced in a flask sufficiently purged with nitrogen, and then, 0.4 mol of $MgCl_2$ and 0.8 mol of $Ti(O-n-C_4H_9)_4$ were introduced therein and reacted at 95° C. for 2 hours. On completion of the reaction, the reaction mixture was cooled to 40° C., and 48 milliliters of methyl hydrogenpolysiloxane (20 centistokes) was introduced and reacted for 3 hours. The solid component thus produced was rinsed with n-heptane.

Then, 50 milliliters of n-heptane purified in the same manner as above was introduced into a flask sufficiently purged with nitrogen, and the solid component synthesized above was measured off equivalent to 0.06 mol of Mg, and introduced into flask. Subsequently, 0.1 mol of $SiCl_4$ was mixed with 25 milliliters of n-heptane, and the mixture was introduced into the flask at 30° C. in 30 minutes to carry out the reaction at 70° C. for 3 hours. Upon completion of the reaction, the resulting product was rinsed with n-heptane. Then, 0.006 mol of phthalic acid chloride was mixed with 25 milliliter of n-heptane, which was introduced into the flask at 70° C. in 30 minutes, and reacted at 90° C. for an hour. Upon completion of the reaction, the resulting product was rinsed with n-heptane. Subsequently, 2.5 mol of TiCl$_4$ was introduced and reacted at 90° C. for 3 hours. Upon completion of the reaction, the resulting product was rinsed with n-heptane sufficiently, and 2.5 mol of TiCl$_4$ was additionally introduced and reacted at 90° C. for 3 hours. Upon completion of the reaction, the resulting product was rinsed sufficiently with n-heptane to obtain a solid component (A1) for producing component (A). The product contained 2.6% by weight of titanium.

Furthermore, 50 milliliters of n-heptane purified in the same manner as above was introduced into a flask sufficiently purged with nitrogen, and 5 grams of the solid component synthesized above was introduced therein and contacted with 1.2 milliliter of (t-C$_4$H$_9$)Si(CH$_3$)(OCH$_3$)$_2$ and 1.7 gram of Al(C$_2$H$_5$)$_3$ at 30° C. for 2 hours. Upon completion of the contact reaction, the reaction product mixture was sufficiently rinsed with n-heptane to obtain a component (A) containing magnesium chloride as the principal component. The product contained 2.6% by weight of titanium.

Polymerization of Propylene

A stainless steel autoclave having an inner volume of 3.0 liters equipped with a stirrer and a thermal controller was heated and dried under vacuum, and after cooling to room temperature, it was substituted with propylene to introduce therein 550 milligrams of Al(C$_2$H$_5$)$_3$ as the component (B) and 56 milligrams of tetramethylurea as component (C) together with 5,000 milliliter of hydrogen, and 1,000 grams of liquid propylene was introduced respectively. After setting the internal temperature to 75° C., propylene polymerization was started with pressure-assisted introduction of 7 milligrams of the component (A) produced above. One hour later, the polymerization was quenched by the pressure-assisted introduction of 10 milliliters of ethanol, and the polymer thus obtained was recovered and dried. Thus, 238.5 (g) of polymer was obtained. The polymer yielded MFR of 23 (g/10 min), polymer bulk density of 0.48 (g/cc), and CXS of 0.7 (wt %).

EXAMPLE-2

The same procedure as that in Example-1 was carried out except for using 55 milligrams of 1,3-dimethyl-2-imidazolidinone in the place of tetramethylurea of component (C). As a result, 205.8 (g) of polymer was obtained. The polymer yielded MFR of 23 (g/10 min), polymer bulk density of 0.48 (g/cc), and CXS of 0.6 (wt %).

EXAMPLE-3

The same procedure as that in Example-1 was carried out except for using 61 milligrams of 1,3-dimethyl-3,4,5,6-tetrahydro-2(1H)-pyrimidinone in the place of tetramethylurea of component (C). As a result, 225.6 (g) of polymer was obtained. The polymer yielded MFR of 23 (g/10 min), polymer bulk density of 0.48 (g/cc), and CXS of 0.8 (wt %).

EXAMPLE-4

The same procedure as that in Example-1 was carried out except for using 49 milligrams of N,N-dimethylpropionamide in the place of tetramethylurea of component (C). As a result, 280.3 (g) of polymer was obtained. The polymer yielded MFR of 32 (g/10 min), polymer bulk density of 0.46 (g/cc), and CXS of 0.9 (wt %).

EXAMPLE-5

The same procedure as that in Example-1 was carried out except for using 116 milligrams of N,N'-dimethyl-N,N'-diphenylurea in the place of tetramethylurea of component (C). As a result, 256.0 (g) of polymer was obtained. The polymer yielded MFR of 30 (g/10 min), polymer bulk density of 0.48 (g/cc), and CXS of 0.9 (wt %).

EXAMPLE-6

The same procedure as that in Example-1 was carried out except for using 82 milligrams of 1,3-diacethyl-2-imidazolidinone in the place of tetramethylurea of component (C). As a result, 219.7 (g) of polymer was obtained. The polymer yielded MFR of 31 (g/10 min), polymer bulk density of 0.48 (g/cc), and CXS of 0.9 (wt %).

COMPARATIVE EXAMPLE-1

The same procedure as that in Example-1 was carried out except for not using tetramethylurea of component (C) As a result, 308.2 (g) of polymer was obtained. The polymer yielded MFR of 34 (g/10 min), polymer bulk density of 0.48 (g/cc), and CXS of 1.4 (wt %).

COMPARATIVE EXAMPLE-2

The same procedure as that in Example-1 was carried out except for not using tetramethylurea of component (C), and for using 80 milligram of (t-C$_4$H$_9$)Si(CH$_3$)(OCH$_3$)$_2$ as component (D). As a result, 291.3 (g) of polymer was obtained. The polymer yielded MFR of 31 (g/10 min), polymer bulk density of 0.47 (g/cc), and CXS of 1.1 (wt %).

COMPARATIVE EXAMPLE-3

The same procedure as that in Example-1 was carried out, except for using 43 milligrams of methyl carbonate in the place of tetramethylurea of component (C). As a result, 102.2 (g) of polymer was obtained. The polymer yielded MFR of 32 (g/10 min), polymer bulk density of 0.48 (g/cc), and CXS of 0.9 (wt %).

COMPARATIVE EXAMPLE-4

The same procedure as that in Example-1 was carried out, except for using 91 milligrams of 2,2-diisopropyl-1,3-dimethoxypropane in the place of tetramethylurea of component (C). As a result, 203.7 (g) of polymer was obtained. The polymer yielded MFR of 39 (g/10 min), polymer bulk density of 0.46 (g/cc), and CXS of 0.8 (wt %).

The results above are shown in Table 1.

TABLE 1

| | Component (C) C(=O)N bond containing organic compound | Component(D) | Yield g | MFR g/10 min | Bulk Density g/cc | CXS wt % | II w % | Density g/cc |
|---|---|---|---|---|---|---|---|---|
| Example-1 | tetramethylurea | None | 238.5 | 23 | 0.48 | 0.7 | 98.1 | 0.9092 |
| Example-2 | 1,3-dimethyl-2-imidazolidinone | None | 205.8 | 23 | 0.48 | 0.6 | 97.7 | 0.9092 |
| Example-3 | 1,3-dimethyl-3,4,5,6-tetrahydro-2(1H)-pyrimidinone | None | 225.6 | 23 | 0.48 | 0.8 | 98.6 | 0.9087 |
| Example-4 | N,N-dimethylpropionamide | None | 280.3 | 32 | 0.46 | 0.9 | 98.5 | 0.9090 |
| Example-5 | N,N'-dimethyl-N,N'-diphenylurea | None | 256.0 | 30 | 0.48 | 0.9 | 98.1 | 0.9092 |
| Example-6 | 1,3-diacetyl-2-imidazolinone | None | 219.7 | 31 | 0.48 | 0.9 | 98.5 | 0.9090 |
| Comparative Example-1 | None | None | 308.2 | 34 | 0.48 | 1.4 | 96.0 | 0.9084 |
| Comparative Example-2 | None | $(t-C_4H_9)Si(CH_3)(OCH_3)_2$ | 291.3 | 31 | 0.47 | 1.1 | 98.2 | 0.9085 |
| Comparative Example-3 | (Methyl carbonate) | None | 102.3 | 32 | 0.48 | 0.9 | 98.2 | 0.9088 |
| Comparative Example-4 | None | 2,2-diisopropyl-1,3-dimethoxypropane | 203.7 | 39 | 0.46 | 0.8 | 97.2 | 0.9084 |

EXAMPLE-7

Production of Component(A)

Two hundred milliliters of dried and deoxidized n-heptane was introduced in a flask sufficiently purged with nitrogen, and then, 0.4 mol of $MgCl_2$ and 0.8 mol of $Ti(O-n-C_4H_9)_4$ were introduced therein and reacted at 95° C. for 2 hours. On completion of the reaction, the reaction mixture was cooled to 40° C., and 48 milliliters of methyl hydropolysiloxane (20 centistokes) was introduced and reacted for 3 hours. The solid component thus produced was rinsed with n-heptane.

Then, 50 milliliters of n-heptane purified in the same manner as above was introduced into a flask sufficiently purged with nitrogen, and the solid component synthesized above was measured off equivalent to 0.06 mol of Mg, and introduced into flask. Subsequently, 0.1 mol of $SiCl_4$ was mixed with 25 milliliters of n-heptane, and the mixture was introduced into the flask at 30° C. in 30 minutes, and reacted at 70° C. for 3 hours. Upon completion of the reaction, the resulting product was rinsed with n-heptane. Then, 0.006 mol of butyl acetate cellosolve was mixed with 25 milliliter of n-heptane, which was introduced into the flask at 70° C. in 30 minutes, and reacted at 90° C. for an hour. Upon completion of the reaction, the resulting product was rinsed with n-heptane. Subsequently, 2.5 mol of $TiCl_4$ was introduced, and reacted at 90° C. for 3 hours. Upon completion of the reaction, the resulting product was rinsed with n-heptane sufficiently, and 2.5 mol of $TiCl_4$ was additionally introduced to carry out reaction at 90° C. for 3 hours. Upon completion of the reaction, the resulting product was rinsed sufficiently with n-heptane to obtain a solid component (A1) for producing component (A). The product contained 2.6% by weight of titanium.

Furthermore, 50 milliliters of n-heptane purified in the same manner as above was introduced into a flask sufficiently purged with nitrogen, and 5 grams of the solid component synthesized above was introduced therein and contacted with 1.5 milliliters of $(t-C_4H_9)Si(n-C_3H_7)(OCH_3)_2$ and 1.7 gram of $Al(C_2H_5)_3$ at 30° C. for 2 hours. Upon completion of the contact reaction, the reaction product mixture was sufficiently rinsed with n-heptane to obtain a component (A) containing magnesium chloride as the principal component. The product contained 2.2% by weight of titanium.

Polymerization of Propylene

The same process as that used in Example-1 was carried out except for using the above component as component (A) and for using 83 milligrams of tetraethylurea in the place of tetramethylurea of component (C). As a result, 272.3 (g) of polymer was obtained. The polymer yielded MFR of 31 (g/10 min), polymer bulk density of 0.48 (g/cc), and CXS of 0.9 (wt %).

EXAMPLE-8

Production of Component (A)

One hundred milliliters of dried and deoxidized toluene was introduced in a flask sufficiently purged with nitrogen, and then, 10 grams of $Mg(OEt)_2$ was introduced to be suspended therein. Then, 20 milliliters of $TiCl_4$ was introduced, and the temperature was raised to 90° C. Then, 2.5 milliliters of di-n-butyl phthalate was introduced, and the temperature was raised to 110° C. and the mixture was reacted for 3 hours. On completion of the reaction, the reaction mixture was rinsed with toluene. Then, 20 milliliters of $TiCl_4$ and 100 milliliters of toluene were introduced and reacted at 110° C. for 2 hours. On completion of the reaction, the product was sufficiently rinsed with n-heptane, and 20 milliliters of $TiCl_4$ and 100 milliliters of toluene were further introduced and reacted at 110° C. for 2 hours. On completion of the reaction, the product was sufficiently rinsed with heptane to obtain a solid component (A1) for producing component (A) The product contained 2.7% by weight of titanium.

Furthermore, 50 milliliters of n-heptane purified in the same manner as above was introduced into a flask sufficiently purged with nitrogen, and 5 grams of the solid component synthesized above was introduced therein and contacted with 1.5 milliliters of $(C_5H_9)_2Si(OCH_3)_2$ and 1.7 gram of $Al(C_2H_5)_3$ at 30° C. for 2 hours. Upon completion of the contact reaction, the reaction mixture was sufficiently rinsed with n-heptane to obtain a component (A) containing magnesium chloride as the principal component. The product contained 2.3% by weight of titanium.

Polymerization of Propylene

The same process as that used in Example-1 was carried out except for using the above component as component (A) and for using 48 milligrams of 1-methyl-2-pyrrolidinone in the place of tetramethylurea of component (C). As a result, 238.5 (g) of polymer was obtained. The polymer yielded MFR of 10 (g/10 min), polymer bulk density of 0.48 (g/cc), and CXS of 1.0 (wt %).

EXAMPLE-9

Production of Component (A)

One hundred milliliters of dried and deoxidized toluene was introduced in a flask sufficiently purged with nitrogen, and then, 10 grams of $Mg(OEt)_2$ was introduced to be suspended therein. Then, 20 milliliters of $TiCl_4$ was introduced, and the temperature was raised to 90° C. Then, 2.5 milliliters of 2,2-diisopropyl-1,3-dimethoxypropane was introduced, and the temperature was raised to 110° C. and the mixture was reacted for 3 hours. On completion of the reaction, the reaction mixture was rinsed with toluene. Then, 20 milliliters of $TiCl_4$ and 100 milliliters of toluene were introduced and reacted at 110° C. for 2 hours. On completion of the reaction, the product was sufficiently rinsed with n-heptane, and 20 milliliters of $TiCl_4$ and 100 milliliters of toluene were further introduced and reacted at 110° C. for 2 hours. On completion of the reaction, the product was sufficiently rinsed with heptane to obtain a solid component (A1) for producing component (A). The product contained 2.7% by weight of titanium.

Furthermore, 50 milliliters of n-heptane purified in the same manner as above was introduced into a flask sufficiently purged with nitrogen, and 5 grams of the solid component synthesized above was introduced therein and contacted with 2.7 milliliters of $(C_6H_{11})CH_3Si(OCH_3)_2$ and 1.7 gram of $Al(C_2H_5)_3$ at 30° C. for 2 hours. Upon completion of the contact reaction, the product was sufficiently rinsed with n-heptane to obtain a component (A) containing magnesium chloride as the principal component. The product contained 2.3% by weight of titanium.

Polymerization of Propylene

The same process as that used in Example-1 was carried out except for using the above component as component (A) and for using 81 milligrams of bis(tetramethylene)urea in the place of tetramethylurea of component (C). As a result, 205.8 (g) of polymer was obtained. The polymer yielded MFR of 15 (g/10 min) polymer bulk density of 0.47 (g/cc), and CXS of 0.7 (wt %).

The results above are given in Table 2.

EXAMPLE-10

Propylene Block Copolymerization

A stainless steel autoclave having an inner volume of 3.0 liters equipped with a stirrer and a thermal controller was heated and dried under vacuum, and after cooling to room temperature, it was substituted with propylene. 550 milligrams of $Al(C_2H_5)_3$ as the component (B), 56 milligrams of tetramethylurea as component (C), 10,000 milliliters of hydrogen, and 1,000 grams of liquid propylene were introduced therein respectively. After setting the internal temperature to 75° C., propylene polymerization was started with pressure-assisted introduction of 7 milligrams of the component (A) produced in Example-1. One hour later, propylene and hydrogen were sufficiently purged to complete the first stage polymerization step. Polymer yield was 219.3 (g). Then, 20 g of the product polymer was sampled under purified nitrogen.

Subsequently, the temperature was raised to 80° C. under stirring, and propylene gas and ethylene gas were charged after elevating the temperature in such a manner that the total pressure of polymerization should become 2.0 MPa to initiate the second polymerization setp. Thus, polymerization was carried out at 80° C. for 20 minutes while supplying a gas mixture of propylene and ethylene in such a manner that the total pressure of polymerization should become 2.0 MPa. In this case, the propylene/(propylene+ethylene) ratio was 45.3 mol % in average.

Then, polymerization was completed by purging the mixed gas. The polymer yield of the thus obtained propylene block copolymer was 236.2 (g), and polymer fraction produced at second step was 16% by weight. The whole polymer product had MFR of 32 (g/10 min), polymer bulk density of 0.48 (g/cc), while the polymer sample at the first step had MFR of 95 (g/10 min), polymer bulk density of 0.47 (g/cc), CXS of 0.8 (wt %), II of 97.27 (wt %), and density of 0.9101 (g/cc).

EXAMPLE-11

Polymerization of Propylene

A stainless steel autoclave having an inner volume of 3.0 liters equipped with a stirrer and a thermal controller was heated and dried under vacuum, and after cooling to room temperature, it was substituted with propylene to introduce therein 550 milligrams of $Al(C_2H_{15})_3$ as the component (B), 56 milligrams of tetramethylurea as component (C), and 80 milligrams of $(t-C_4H_9)Si(CH_3)(OCH_3)_2$ as component (D),

TABLE 2

| | Component (C) C(=O)N bond containing organic compound | Yield g | MFR g/10 min | Bulk Density g/cc | CXS wt % | II wt % | Density g/cc |
|---|---|---|---|---|---|---|---|
| Example-7 | tetraethylurea | 272.3 | 31 | 0.48 | 0.9 | 97.0 | 0.9087 |
| Example-8 | 1-methyl-2-pyrrolidinone | 238.5 | 10 | 0.48 | 1.0 | 97.9 | 0.9088 |
| Example-9 | bis(tetramethylene) urea | 205.8 | 15 | 0.47 | 0.7 | 97.1 | 0.9092 | together with 5,000 milliliters of hydrogen, and 1,000 grams of liquid propylene was introduced respectively. After setting the internal temperature to 75° C., propylene polymerization was started with pressure-assisted introduction of 7 milligrams of the solid component (A1) produced in Example-1. One hour later, the polymerization was quenched by the pressure-assisted introduction of 10 milliliters of ethanol, and the polymer thus obtained was recovered and dried. As a result, 215.2 (g) of the polymer was obtained. The polymer yielded MFR of 15 (g/10 min), polymer bulk density of 0.49 (g/cc), and CXS of 0.8 (wt %).

EXAMPLE-12

The same process as that of Example-11 was carried out, except for using 55 milligrams of 1,3-dimethyl-2-imidazolidinone in the place of tetramethylurea of component (C) in Example-11. As a result, 219.8 (g) of the polymer was obtained. The polymer yielded MFR of 11 (g/10 min), polymer bulk density of 0.48 (g/cc), and CXS of 0.7 (wt %).

EXAMPLE-13

The same process as that of Example-11 was carried out, except for using 61 milligrams of 1,3-dimethyl-3,4,5,6-tetrahydro-2(1H)-pyrimidinone in the place of tetramethylurea of component (C) in Example-11. As a result, 206.5 (g) of the polymer was obtained. The polymer yielded MFR of 11 (g/10 min), polymer bulk density of 0.48 (g/cc), and CXS of 0.8 (wt %).

EXAMPLE-14

The same process as that of Example-11 was carried out, except for using 49 milligrams of N,N-dimethylpropionamide in the place of tetramethylurea of component (C) in Example-11. As a result, 215.2 (g) of the polymer was obtained. The polymer yielded MFR of 13 (g/10 min), polymer bulk density of 0.48 (g/cc), and CXS of 0.8 (wt %).

EXAMPLE-15

The same procedure as that in Example-11 was carried out except for using 55 milligrams of 1,3-dimethyl-2-imidazolidinone in the place of tetramethylurea of component (C) in Example-11, and for using 104 milligrams of 2,2-diisopropyl-1,3-dimethoxypropane in the place of $(t-C_4H_9)Si(CH_3)(OCH_3)_2$ as component (D). As a result, 154.3 (g) of polymer was obtained. The polymer yielded MFR of 32.5 (g/10 min), polymer bulk density of 0.48 (g/cc), and CXS of 0.7 (wt %).

COMPARATIVE EXAMPLE-5

The same procedure as that in Example-11 was carried out except for not using tetramethylurea of component (C) in Example-11. As a result, 204.2 (g) of polymer was obtained. The polymer yielded MFR of 25 (g/10 min), polymer bulk density of 0.47 (g/cc), and CXS of 1.5 (wt %).

COMPARATIVE EXAMPLE-6

The same procedure as that in Example-11 was carried out except for using 36 milligrams of methyl acetate in the place of tetramethylurea of component (C) in Example-11. As a result, 208.8 (g) of polymer was obtained. The polymer yielded MFR of 40 (g/10 min), polymer bulk density of 0.46 (g/cc), and CXS of 1.5 (wt %).

The results above are given in Table 3.

TABLE 3

| | Component (C) C(=O)N bond containing organic compound | Yield g | MFR g/10 min | Bulk Density g/cc | CXS wt % | II wt % | Density g/cc |
|---|---|---|---|---|---|---|---|
| Example-10 | Tetramethylurea | 236.2 | 32 | 0.48 | | | |
| Example-11 | Tetramethylurea | 215.2 | 15 | 0.49 | 0.9 | 98.8 | 0.9090 |
| Example-12 | 1,3-dimethyl-2-imidazolidinone | 219.8 | 11 | 0.48 | 0.7 | 98.7 | 0.9085 |
| Example-13 | 1,3-dimethyl-3,4,5,6-tetrahydro-2(1H)-pyrimidinone | 206.5 | 11 | 0.48 | 0.8 | 98.6 | 0.9096 |
| Example-14 | N,N-dimethylpropionamide | 215.2 | 13 | 0.48 | 0.8 | 98.4 | 0.9086 |
| Example-15 | 1,3-dimethyl-2-imidazolidinone | 154.3 | 32.5 | 0.48 | 0.7 | 98.8 | 0.9090 |
| Comparative Example-5 | None | 204.2 | 25 | 0.47 | 1.5 | 96.0 | 0.9082 |
| Comparative Example-6 | (methyl acetate) | 208.8 | 40 | 0.46 | 1.5 | 96.5 | 0.9088 |

EXAMPLE-16

Polymerization of Propylene

The same process as that of Example-11 was carried out, except for using the solid component (A1) produced in Example-7 as component (A), 83 milligrams of tetraethylurea in the place of tetramethylurea of component (C), and 90 milligrams of $(t-C_4H_9)Si(n-C_3H_7)(OCH_3)_2$ in the place of $(t-C_4H_9)Si(CH_3)(OCH_3)_2$ as component (D). As a result, 203.6 (g) of the polymer was obtained. The polymer yielded MFR of 16 (g/10 min), polymer bulk density of 0.47 (g/cc), and CXS of 0.9 (wt %).

EXAMPLE-17

Polymerization of Propylene

The same process as that of Example-11 was carried out, except for using the solid component (A1) produced in Example-8 as component (A), 48 milligrams of 1-methyl-2-pyrrolidinone in the place of tetramethylurea of component (C), and 110 milligrams of $(C_5H_9)_2Si(OCH_3)_2$ in the place of $(t-C_4H_9)Si(CH_3)(OCH_3)_2$ as component (D). As a result, 198.5 (g) of the polymer was obtained. The polymer yielded MFR of 20 (g/10 min), polymer bulk density of 0.46 (g/cc), and CXS of 1.0 (wt %).

EXAMPLE-18

Polymerization of Propylene

The same process as that of Example-11 was carried out, except for using the solid component (A1) produced in Example-9 as component (A), 81 milligrams of bis(tetramethylene)urea in the place of tetramethylurea of component (C), and 180 milligrams of $(C_9H_{17}N)_2Si(OCH_3)_2$ in the place of $(t-C_4H_9)Si(CH_3)(OCH_3)_2$ as component (D) As a result, 225.7 (g) of the polymer was obtained. The polymer yielded MFR of 16 (g/10 min), polymer bulk density of 0.47 (g/cc), and CXS of 0.7 (wt %).

COMPARATIVE EXAMPLE-7

Polymerization of Propylene

The same polymerization as that of Example-18 was carried out, except for using the component (A1) produced in Example-9 as component (A), and for not using component (C).

The results above are given in Table 4.

(D), and 15 milligrams of component (A1) produced in Example-1, were introduced respectively, followed by 390 milliliters of hydrogen. Then, the temperature and the pressure were raised. Propylene polymerization was carried out at a polymerization pressure of 5 g/cm$^2$G and a polymerization temperature of 75° C. for 2 hours. On completing the polymerization, the polymer slurry thus obtained was filtrated and the polymer was dried. As a result, 144.5 g of polymer was obtained.

The atactic polymer having low stereoregularity and dissolved in the filtrate was 0.2% by weight. By the boiling heptane extraction, the total product II (T-II) was found to be 98.5% by weight. The polymer thus obtained yielded MFR of 8.4 (g/10 min) and polymer bulk density of 0.42 (g/cc).

The results above are given in Table 5.

TABLE 5

|  | Component (C) C(=O)N bond containing organic compound | Component(D) Silicon Compound | Yield g | MFR g/10 min | Bulk Density g/cc | Atactic fraction wt % | T-II wt % |
|---|---|---|---|---|---|---|---|
| Example-19 | 1,3-dimethyl-2-imidazolidinone | $(t-C_4H_9)Si(CH_3)(OCH_3)_2$ | 144.5 | 8.4 | 0.42 | 0.2 | 98.5 |

EXAMPLE-20

Production of Component (A)

Two hundred milliliters of dried and deoxidized n-heptane was introduced in a flask sufficiently purged with nitrogen, and then, 0.4 mol of MgCl$_2$ and 0.8 mol of Ti(O-n-C$_4$H$_9$)$_4$ were introduced therein and reacted at 95° C. for 2 hours. On completion of the reaction, the reaction mixture was cooled to 40° C., and 48 milliliters of methyl hydrogenpolysiloxane (20 centistokes) was introduced and reacted for 3 hours. The solid component thus produced was rinsed with n-heptane.

Then, 50 milliliters of n-heptane purified in the same manner as above was introduced into a flask sufficiently

TABLE 4

|  | Component (C) C(=O)N bond containing organic compound | Yield g | MFR g/10 min | Bulk Density g/cc | CXS wt % | II wt % | Density g/cc |
|---|---|---|---|---|---|---|---|
| Example-16 | Tetraethylurea | 203.6 | 16 | 0.47 | 0.9 | 97.8 | 0.9086 |
| Example-17 | 1-methyl-2-pyrrolidinone | 198.5 | 20 | 0.46 | 1.0 | 98.1 | 0.9088 |
| Example-18 | bis(tetramethylene)urea | 225.7 | 16 | 0.47 | 0.7 | 98.4 | 0.9090 |
| Comparative Example-7 |  | 234.5 | 68 | 0.47 | 2.0 | 96.0 | 0.9075 |

EXAMPLE-19

Polymerization of Propylene

A stainless steel autoclave having an inner volume of 1.5 liters equipped with a stirrer and a thermal controller was sufficiently substituted with gaseous propylene, into which 500 ml of sufficiently dried and deoxidized n-heptane, 550 milligrams of Al(C$_2$H$_5$)$_3$ as the component (B), 12 milligrams of 1,3-dimethyl-2-imidazolidinone as component (C), 17 milligrams of $(t-C_4H_9)Si(CH_3)(OCH_3)_2$ as component purged with nitrogen, and the solid component synthesized above was measured off equivalent to 0.06 mol of Mg, and introduced into flask. Subsequently, 0.2 mol of SiCl$_4$ was mixed with 25 milliliters of n-heptane, and the mixture was introduced into the flask at 30° C. in 30 minutes, and reacted at 90° C. for 4 hours. Upon completion of the reaction, the resulting product was rinsed with n-heptane to obtain a solid component for use in producing component (A) The product contained 3.5% by weight of titanium.

Furthermore, 50 milliliters of n-heptane purified in the same manner as above was introduced into a flask suffi ciently purged with nitrogen, and 5 grams of the solid component synthesized above was introduced therein and contacted with 0.2 mol of $SiCl_4$, 2.8 milliliter of $(t-C_4H_9)Si(CH_3)(OCH_3)_2$, and 9.0 gram of $Al(C_2H_5)_3$ at 30° C. for 2 hours. Upon completion of the contact reaction, the reaction product mixture was sufficiently rinsed with n-heptane to obtain a component (A) containing magnesium chloride as the principal component. The product contained 3.0% by weight of titanium.

Polymerization of Propylene

A stainless steel autoclave having an inner volume of 1.5 liters equipped with a stirrer and a thermal controller was sufficiently substituted with gaseous propylene, into which 500 ml of sufficiently dehydrated and deoxidized n-heptane, 125 milligrams of $Al(C_2H_5)_3$ as the component (B), 12 milligrams of 1,3-dimethyl-2-imidazolidinone as component (C), and 15 milligrams of component (A) produced above, were introduced respectively, followed by the introduction of 130 milliliters of hydrogen. Then, the temperature and the pressure were raised. Propylene polymerization was carried out at a polymerization pressure of 5 $g/cm^2G$ and a polymerization temperature of 75° C. for 2 hours. On completing the polymerization, the polymer slurry thus obtained was filtrated and the polymer was dried. As a result, 46.5 g of polymer was obtained.

The atactic polymer having low stereoregularity and dissolved in the filtrate was 0.9% by weight. By the boiling heptane extraction, T-II was found to be 96.4% by weight. The polymer thus obtained yielded MFR of 6.6 (g/10 min) and polymer bulk density of 0.36 (g/cc).

EXAMPLE-21

The same process as that of Example-20 was carried out, except for using N,N-dimethylpropionamide in the place of 1,3-dimethyl-2-imidazolidinone as component (C) in Example-20. As a result, 48.3 (g) of polymer was obtained. Thus obtained polymer yielded an atactic fraction of 1.2% by weight, T-II of 95.9% by weight, MFR of 7.0 (g/10 min), and polymer bulk density of 0.38 (g/cc).

COMPARATIVE EXAMPLE-8

The same process as that of Example-20 was carried out, except for not using 1,3-dimethyl-2-imidazolidinone as component (C) in Example-20. As a result, 64.0 (g) of polymer was obtained. Thus obtained polymer yielded an atactic fraction of 1.5% by weight, T-II of 92.9% by weight, MFR of 8.6 (g/10 min), and polymer bulk density of 0.34 (g/cc).

COMPARATIVE EXAMPLE-9

The same process as that of Example-20 was carried out, except for using 17 milligrams of $(t-C_4H_9)Si(CH_3)(OCH_3)_2$ in the place of 1,3-dimethyl-2-imidazolidinone as component (C) in Example-20. As a result, 47.4 (g) of polymer was obtained. Thus obtained polymer yielded an atactic fraction of 1.0% by weight, T-II of 95.3% by weight, MFR of 7.3 (g/10 min), and polymer bulk density of 0.35 (g/cc).

The results above are given in Table 6.

TABLE 6

| | Component (C) C(=O)N bond containing organic compound | Yield g | MFR g/10 min | Bulk Density g/cc | Atactic fraction wt % | T-II wt % |
|---|---|---|---|---|---|---|
| Example-20 | 1,3-dimethyl-2-imidazolidinone | 46.5 | 6.6 | 0.36 | 0.9 | 96.4 |
| Example-21 | N,N-dimethyl propionamide | 48.3 | 7.0 | 0.38 | 1.2 | 95.9 |
| Comparative Example-8 | None | 64.0 | 8.6 | 0.34 | 1.5 | 92.9 |
| Comparative Example-9 | $(t-C_4H_9)Si(CH_3)(OCH_3)_2$ | 47.4 | 7.3 | 0.35 | 1.0 | 95.3 |

EXAMPLE-22

Production of Component (A)

One hundred milliliters of dried and deoxidized toluene was introduced in a flask sufficiently purged with nitrogen, and then, 10 grams of $Mg(OEt)_2$ was introduced to be suspended therein. Then, 20 milliliters of $TiCl_4$ was introduced, and the temperature was raised to 90° C. Then, 2.5 milliliters of 2,2-diisopropyl-1,3-dimethoxypropane was introduced, and the temperature was raised to 110° C. and the mixture was reacted for 3 hours. On completion of the reaction, the reaction mixture was rinsed with toluene. Then, 20 milliliters of $TiCl_4$ and 100 milliliters of toluene were introduced and reacted at 110° C. for 2 hours. On completion of the reaction, the product was sufficiently rinsed with n-heptane to obtain a solid component (A1). The product contained 2.6% by weight of titanium. Furthermore, 50 milliliters of n-heptane purified in the same manner as above was introduced into a flask sufficiently purged with nitrogen, and 5 grams of the solid component synthesized above was introduced therein and contacted with 1.5 milliliters of $(C_5H_9)_2Si(OCH_3)_2$ and 1.7 gram of $Al(C_2H_5)_3$ at 30° C. for 2 hours. Upon completion of the contact reaction, the reaction mixture was sufficiently rinsed with n-heptane to obtain a component (A) containing magnesium chloride as the principal component. The product contained 2.3% by weight of titanium.

Polymerization of Propylene

A stainless steel autoclave having an inner volume of 1.5 liters equipped with a stirrer and a thermal controller was sufficiently substituted with gaseous propylene, into which 500 ml of sufficiently dried and deoxidized n-heptane, 125 milligrams of $Al(C_2H_5)_3$ as the component (B), 12 milligrams of 1,3-dimethyl-2-imidazolidinone as component (C), and 15 milligrams of component (A) produced above, were introduced respectively, followed by the introduction of 130 milliliters of hydrogen. Then, the temperature and the pressure were raised. Propylene polymerization was carried out at a polymerization pressure of 5 g/cm$^2$G and a polymerization temperature of 75° C. for 2 hours. On completing the polymerization, the polymer slurry thus obtained was filtrated and the polymer was dried. As a result, 92.4 g of polymer was obtained.

The atactic polymer having low stereoregularity and dissolved in the filtrate was 0.2% by weight. By the boiling heptane extraction, the total product II (T-II) was found to be 98.9% by weight. The polymer thus obtained yielded MFR of 18.5 (g/10 min) and polymer bulk density of 0.40 (g/cc).

EXAMPLE-23

Polymerization of Propylene

The same process as that of Example-22 was carried out, except for using the solid component (A1) produced in Example-22 as component (A), 13 milligrams of tetramethylurea in the place of 1,3-dimethyl-2-imidazolidinone for component (C), and 17 milligrams of (t-C$_4$H$_9$)Si(CH$_3$)(OCH$_3$)$_2$ for component (D). As a result, 135.3 g of polymer was obtained. The polymer yielded atactic fraction of 0.2% by weight, T-II of 98.0% by weight, MFR of 14.6 (g/10 min), and polymer bulk density of 0.38 (g/cc)

The results are given in Table 7.

TABLE 7

| | Component (C) C(=O)N bond containing organic compound | Yield g | MFR g/10 min | Bulk Density g/cc | Atactic fraction wt % | T-II wt % |
|---|---|---|---|---|---|---|
| Example-22 | 1,3-dimethyl-2-imidazolidinone | 92.4 | 18.5 | 0.40 | 0.2 | 98.9 |
| Example-23 | tetramethylurea | 135.3 | 14.6 | 0.38 | 0.5 | 98.0 |

EXAMPLEs-24 to -29

Polymerization of Propylene

The same process as that of Example-1 was carried out, except for using 7 milligrams of component (A) produced in Example-1 and for using the components (C) each at predetermined amounts shown in Table 8. The results are given in Table 8.

Results and Discussion of the Examples and Comparative Examples

By comparing the results obtained in Example-1 to -29 and in Comparative Example-1 to -9, it can be clearly understood that, as compared to the comparative examples, the present invention yields superior results in the balance of yield, bulk density, cold xylene solubility (CXS), insoluble fraction to boiling heptane (II), and the like.

More specifically, it can be seen that Comparative example 1 not using any components (C) and Comparative example 2 using the other compound than the present invention as component (C) are superior to Examples 1 to 6 only in yield, but are extremely inferior in cold xylene solubility (CXS); Comparative example 1 is also low in boiling heptane insoluble fraction (II). In Comparative example 3, in which the other compound than the present invention is used as component (C), the yield is found to be extremely low; concerning Comparative example 4, in which the other compound than the present invention is used as component (C), the yield and the boiling heptane insoluble fraction (II) are both poor. Similarly, in Comparative examples 5 to 7, in which component (C) is not used, or the other compound than the present invention is used as component (C), in particular, it is found that the physical properties of cold xylene solubility (CXS) and boiling heptane insoluble fraction (II) are inferior. Concerning Comparative example 8, in which component (C) is not used, the atactic fraction and the total product II (T-II) are poor, and in Comparative example 8, in which the other compound than the present invention was used as component (C), the total product II (T-II) is found to be inferior.

INDUSTRIAL APPLICABILITY

The catalyst for polymerizing α-olefin according to the present invention has high catalyst activity and provides excellent yield at polymerization; the α-olefin polymer polymerized by the catalyst for polymerizing α-olefin according to the present invention is characterized in that it contains extremely low amorphous component and that has high stereoregularity; furthermore, it exhibits high density, stiffness, heat resistance, and excellent mechanical properties.

Furthermore, the α-olefin polymer can be favorably utilized in usages requiring high stiffness and high heat resistance, such as automobile parts, electric appliances, wrapping materials, and the like.

TABLE 8

| | Component (C) C(=O)N bond containing organic compound | Amount Used mg | Yield g | MFR g/10 min | Bulk Density g/cc | CXS wt % | II wt % | Density g/cc |
|---|---|---|---|---|---|---|---|---|
| Example-24 | 1-ethyl-2-pyrrolidinone | 60 | 279.4 | 23 | 0.48 | 0.5 | 99.0 | 0.9094 |
| Example-25 | 1-dodecyl-2-pyrrolidinone | 120 | 229.0 | 28 | 0.48 | 0.6 | 98.3 | 0.9093 |
| Example-26 | 1-cyclohexyl-2-pyrrolidinone | 80 | 199.2 | 28 | 0.48 | 0.7 | 99.0 | 0.9092 |
| Example-27 | 1-phenyl-2-pyrrolidinone | 80 | 222.7 | 26 | 0.48 | 0.8 | 99.1 | 0.9091 |
| Example-28 | 1-methyl-2-pyrridone | 55 | 150.3 | 23 | 0.48 | 0.5 | 98.8 | 0.9094 |
| Example-29 | N-methyl-ε-caprolactam | 60 | 214.9 | 23 | 0.48 | 0.7 | 98.8 | 0.9092 |

The invention claimed is:

1. A catalyst for polymerizing α-olefin, comprising a combination of:
   a component (A) that is a solid catalyst component comprising magnesium, titanium, and a halogen as an essential component;
   a component (B) that is an organoaluminum compound;
   a component (C) that is a compound comprising a C(=O)N bond selected from the group consisting of tetramethylurea, tetraethylurea, bis(tetramethylene) urea, N,N'dimethyl-N,N'-diphenylurea, 1,3-dimethyl-2-imidazolidinone, 1,3-dimethyl-3,4,5,6-tetrahydro-2 (1H)-pyrimidinone, N,N-dimethylpropionamide, 1,3-diacetyl-2-imidazolidinone, 1-methyl-2-pyrrolidinone, 1-ethyl-2-pyrrolidinone, 1-dodecyl-2-pyrrolidinone, 1-cyclohexyl-2-pyrrolidinone, 1-phenyl-2-pyrrolidinone, and N-methyl-ε-caprolactam; and
   a component (D) that is a silicon compound or a compound having at least 2 ether bonds.

2. A production method for an α-olefin polymer, comprising
   homopolymerizing or copolymerizing an α-olefin by contacting the α-olefin under homopolymerizing or copolymerizing conditions with the catalyst of claim 1.

3. A catalyst for polymerizing α-olefin, comprising a combination of:
   a component (A) that is a solid catalyst component comprising magnesium, titanium, and a halogen as an essential component;
   a component (B) that is an organoaluminum compound; a component (C) that is a compound comprising a C(=O)N bond having the following formula (2):

(2)

wherein $R^4$ to $R^7$ each represent an aliphatic hydrocarbon group having 1-20 carbon atoms, an alicyclic hydrocarbon group having 1-20 carbon atoms, an aromatic hydrocarbon group having 6-20 carbon atoms, or a heteroatom-containing hydrocarbon group, wherein any two of $R^4$ to $R^7$ are combined to form a ring structure; and
a component (D) that is a silicon compound, or a compound having at least ether bonds.

4. A production method for an α-olefin polymer, comprising
   homopolymerizing or copolymerizing an α-olefin by contacting the α-olefin under homopolymerizing or copolymerizing conditions with the catalyst of claim 3.

5. A catalyst for polymerizing α-olefin, comprising a combination of:
   a component (A) that is a solid catalyst component comprising magnesium, titanium, and a halogen as an essential component;
   a component (B) that is an organoaluminum compound;
   a component (C) that is a compound comprising a C(=O)N bond having formula (1):

(1)

wherein $R^1$ to $R^3$ each represent an aliphatic hydrocarbon group having 1 to 20 carbon atoms, an alicyclic hydrocarbon group having 1 to 20 carbon atoms, an aromatic hydrocarbon group having 6 to 20 carbon atoms, or a hetero atom-containing hydrocarbon group, wherein any two of $R^1$ to $R^3$ are combined to form a ring structure; and
a component (D) that is a silicon compound, or a compound having at least two ether bonds.

6. A production method for an α-olefin polymer, comprising
   homopolymerizing or copolymerizing an α-olefin by contacting the α-olefin under homopolymerizing or copolymerizing conditions with the catalyst of claim 5.

* * * * *